United States Patent
Inuzuka

(10) Patent No.: US 8,477,150 B2
(45) Date of Patent: Jul. 2, 2013

(54) DISPLAY SIGNAL CONVERSION APPARATUS

(75) Inventor: Tatsuki Inuzuka, Mito (JP)

(73) Assignees: Hitachi Displays, Ltd., Chiba (JP); Panasonic Liquid Crystal Display Co., Ltd., Hyogo-Ken (JP)

( * ) Notice: Subject to any disclaimer, the term of this patent is extended or adjusted under 35 U.S.C. 154(b) by 590 days.

(21) Appl. No.: 12/756,534

(22) Filed: Apr. 8, 2010

(65) Prior Publication Data

US 2010/0259569 A1 Oct. 14, 2010

(30) Foreign Application Priority Data

Apr. 10, 2009 (JP) ................................ 2009-095951

(51) Int. Cl.
G09G 5/02 (2006.01)

(52) U.S. Cl.
USPC ........... 345/604; 345/589; 345/694; 345/695; 345/696

(58) Field of Classification Search
None
See application file for complete search history.

(56) References Cited

U.S. PATENT DOCUMENTS

| 7,123,277 | B2 * | 10/2006 | Brown Elliott et al. | 345/690 |
| 8,248,430 | B2 * | 8/2012 | Hekstra et al. | 345/589 |
| 2003/0034992 | A1 | 2/2003 | Brown Elliott et al. | |
| 2004/0051724 | A1 * | 3/2004 | Elliott et al. | 345/694 |
| 2010/0259556 | A1 * | 10/2010 | Inuzuka | 345/604 |

FOREIGN PATENT DOCUMENTS

| JP | 60-061724 | 4/1985 |
| JP | 06-324649 | 11/1994 |
| JP | 2003-241718 | 8/2003 |
| JP | 2004-286803 | 10/2004 |
| JP | 2004-538523 | 12/2004 |

* cited by examiner

*Primary Examiner* — Antonio A Caschera
(74) *Attorney, Agent, or Firm* — Antonelli, Terry, Stout & Kraus, LLP.

(57) ABSTRACT

A display signal conversion apparatus converts a first signal having a first color format and color arrangement into a second signal having a second color format and color arrangement. The display signal conversion apparatus includes a color conversion unit configured to convert the first color format into the second color format, a pattern determination unit configured to determine a signal pattern of the first signal, a unit configured to determine a color arrangement of a pixel position of the second signal corresponding to a pixel position of the first signal, and a sub pixel signal generation unit configured to generate a sub pixel signal having the second color format and color arrangement based on a result of the signal pattern determination and a result of the color arrangement determination.

15 Claims, 14 Drawing Sheets

FIG.5

| CLASS | DETECTED PATTERN | PROCESS RE RG PIXEL | PROCESS RE BW PIXEL |
|---|---|---|---|
| BLACK FINE LINE IN YELLOW BACKGROUND |  | 1. SUB PIXEL ARRANGEMENT IN REFERENCE RANGE<br>2. SUB PIXEL ARRANGEMENT ON TARGET LINE<br>3. EDGE IS LOST IF TURNING ON AS IT IS<br>4. SAVE EDGE BY TURNING ON ADJACENT PIXEL | 1. SUB PIXEL ARRANGEMENT IN REFERENCE RANGE<br>2. SUB PIXEL ARRANGEMENT ON TARGET LINE<br>3. NO DETERIORATION WHEN TURNING ON AS IT IS<br>4. THROUGH OUTPUT |

FIG.6

| CLASS | DETECTED PATTERN | PROCESS RE RG PIXEL | PROCESS RE BW PIXEL |
|---|---|---|---|
| WHITE AND BLACK PATTERN | 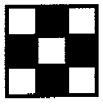 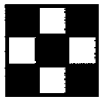 | 1. SUB PIXEL ARRANGEMENT IN REFERENCE RANGE <br>2. SUB PIXEL ARRANGEMENT ON TARGET LINE <br>3. DISPLAY WITH COLOR IF TURNING ON AS IT IS <br>4. TURN ON W PIXEL  | 1. SUB PIXEL ARRANGEMENT IN REFERENCE RANGE <br>2. SUB PIXEL ARRANGEMENT ON TARGET LINE <br>3. DISPLAY WITH COLOR IF TURNING ON AS IT IS <br>4. TURN ON W PIXEL  |

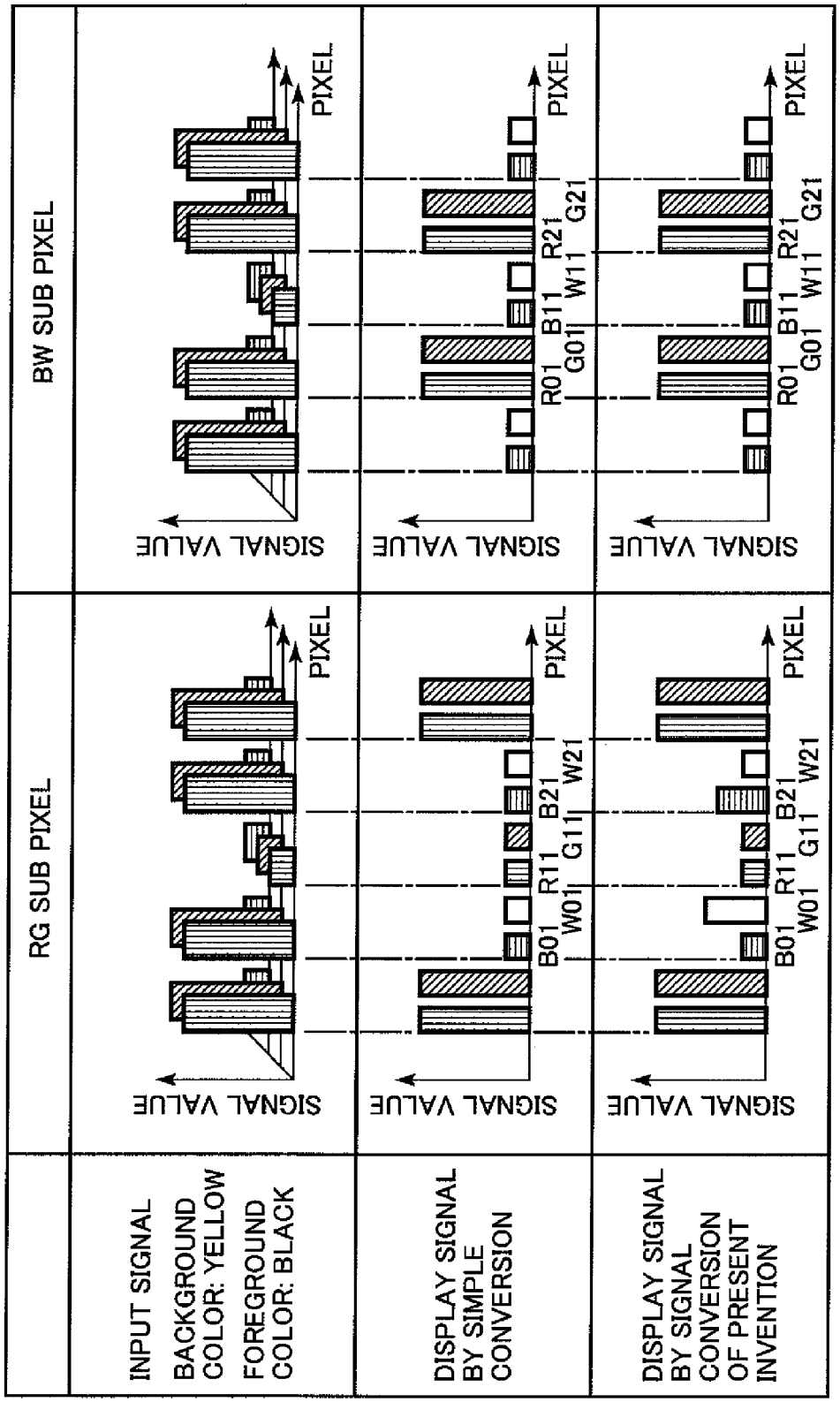

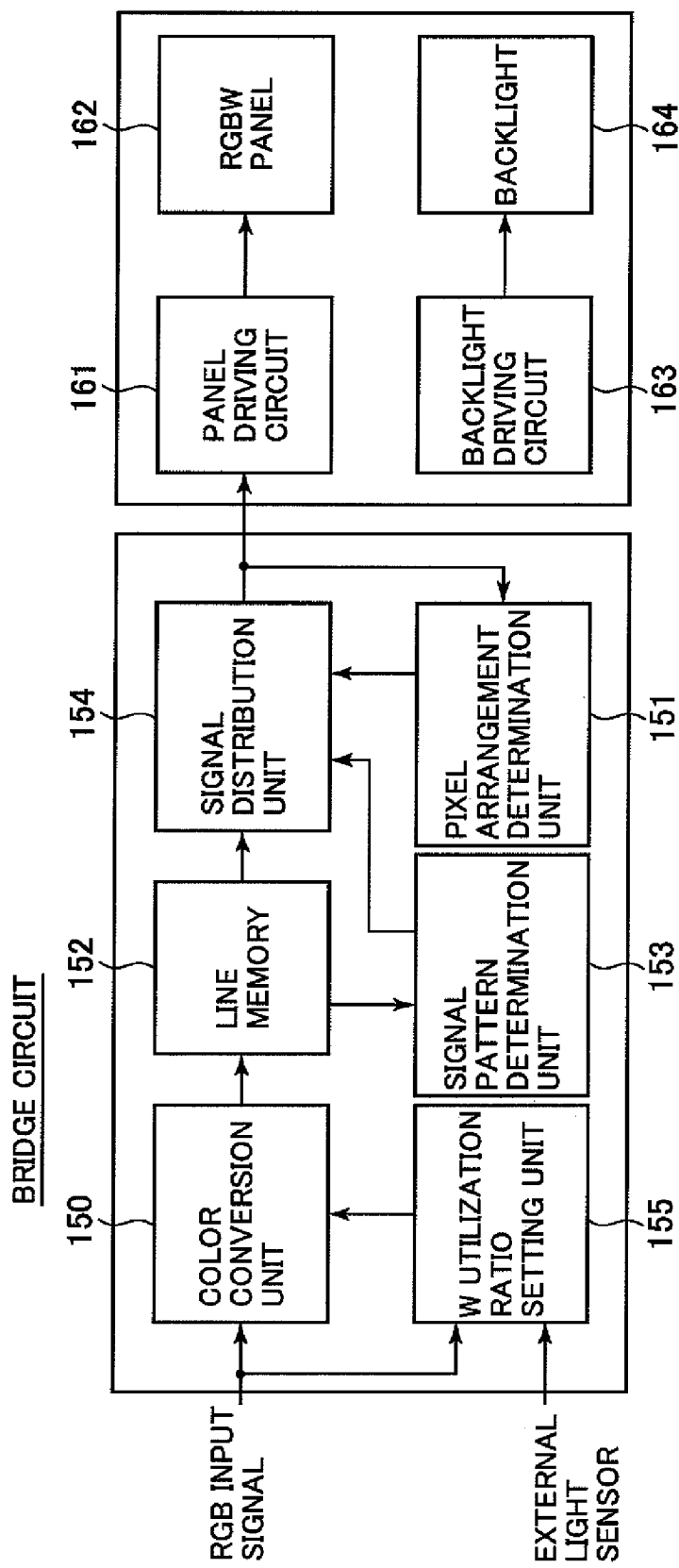

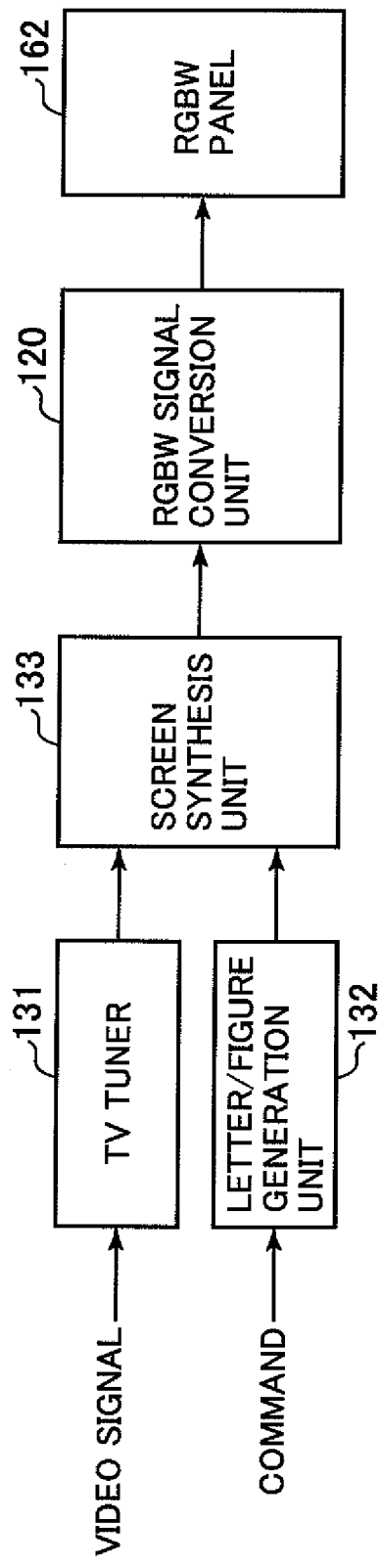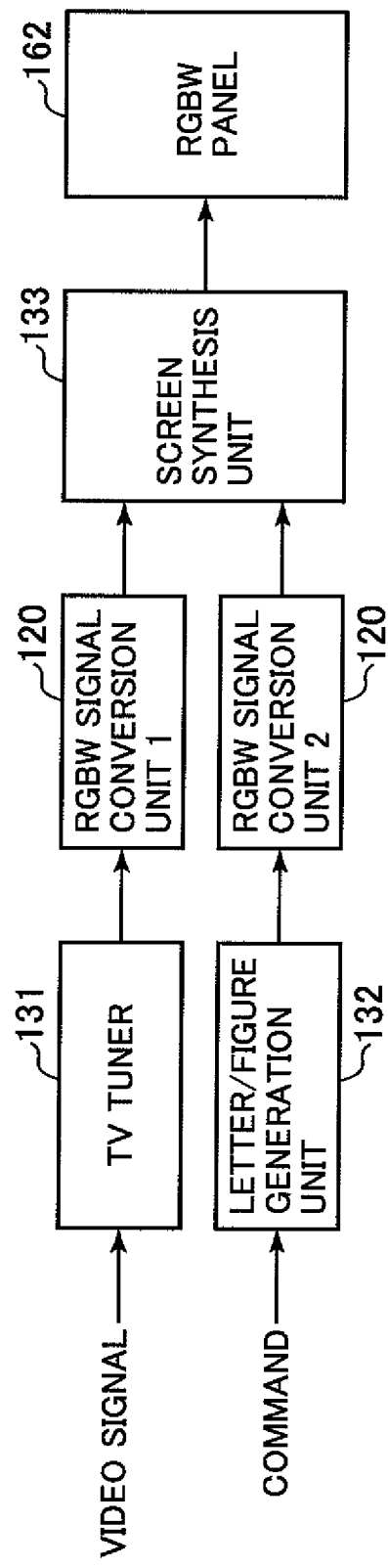

DISPLAY SIGNAL CONVERSION APPARATUS

CROSS-REFERENCE TO RELATED APPLICATION

The present application claims priority from Japanese Application JP 2009-095951 filed on Apr. 10, 2009, the content to which is hereby incorporated by reference into this application.

BACKGROUND OF THE INVENTION

1. Field of the Invention

The present invention relates to a display signal conversion apparatus particularly to a signal conversion from an RGB input signal to an RGBW display signal.

2. Description of the Related Art

As described in "New-Edition Color Science Handbook, 2nd edition," edited by the Color Science Association of Japan, University of Tokyo Press, originally printed in 1998, a color image may be constituted by RGB (red, green, and blue) three color signals. Further, a smallest unit of a color image is called a pixel. A screen that is a set of pixels is called image data, a video signal, a color signal, or the like depending on fields. In the following description, those terms may be used in a mixed manner.

Display devices based on various principles have been developed for the purpose of displaying a color image by supplying a video signal. Among them, a liquid crystal panel has a large number of liquid crystal elements for controlling transmittance, which are arranged in a plane so as to constitute a screen. In this display principle, RGB three colors may not be disposed at the same position, and hence color filters of RGB three colors are shifted regularly. A minimum unit of each color display is called a sub pixel, and a set of adjacent RGB sub pixels is called a pixel.

In the following description, the terms of pixel and sub pixel may be used in a mixed manner. As described above, for a mechanical reason of the display device, a type or format of color and a position of color should be considered. Practically, misregistration of sub pixels may not be recognized in many cases, but may be perceived as a smoothness of a contour of a letter or a figure in some cases of a mobile terminal or the like with a short visual distance.

A video signal distributed in common is expressed by RGB three colors per pixel or by a signal that may be converted into RGB three colors. For instance, a video signal of a color television is constituted by a luminance signal and two types of color-difference signals, which may be converted into RGB three colors by simple conversion equations.

A video signal distributed in common may have the number of pixels that is different from the number of pixels included in the screen depending on a broadcasting type. For instance, the number of pixels of a color television video signal is different between analog terrestrial broadcasting and satellite high definition broadcasting. Therefore, the number of pixels is converted so that display may be performed on the same display device. In this way, in order to adjust a difference between the input video signal and characteristic of the display device, it is known to perform signal processing such as conversion of a color type, conversion of a color arrangement (sub pixel rendering), and the like.

The liquid crystal panel that performs transmittance control is combined with a light source so as to function as a display. A type of the light source for use is not limited, but the following description exemplifies the case where a light emission unit (backlight) is disposed on the opposite side to the display screen.

A color image to be displayed is generated by combining a wavelength characteristic of the backlight and wavelength characteristics of sub pixels of the RGB three colors. As combined transmittance thereof is higher, light emission of the backlight may be used more efficiently.

JP 60-61724 A discloses a technology for improving the transmittance by providing four color sub pixels including white (W) color in addition to the above-mentioned RGB three colors. Because a color filter is not necessary for W sub pixels, the transmittance is improved three times as compared with the transmittance of RGB sub pixels. The RGB sub pixels and the W sub pixel are arranged in an appropriate order so that the transmittance may be improved.

In addition, JP 2004-538523 A discloses an example of signal processing in which a sub pixel arrangement conversion (sub pixel rendering process) is noted. JP 2004-538523 A discloses a method of performing the signal conversion by filtering process in which the signal conversion method is analyzed from a viewpoint of frequency components in the case where a pixel position of an input signal is different from a sub pixel position of the display panel. The filtering process is a well-known signal processing technology defined by a convolution integral of the input signal and a coefficient, which is characterized in coefficient setting for the purpose of maintaining image quality accompanying a sub pixel arrangement. In addition, when the filtering process is performed, gamma conversion for securing linearity of the signal is essential.

In addition, JP 2004-538523 A discloses, a correction technology for a result of the filtering process operation using a monochrome fine line pattern detection unit on the assumption that sufficient image quality may not be obtained only by the above-mentioned filtering process (blurred fine line or color balance shift).

SUMMARY OF THE INVENTION

One object of one or more embodiments of the present invention is improving brightness, i.e., realizing a method and an apparatus for converting a first signal to be input to a second signal to be used for display so as to reduce power consumption of a display panel by enhancing its transmittance.

The contents thereof involve color conversion from a color type of a first signal to a color type of a second signal, and arrangement conversion from a color arrangement of the first signal to a color arrangement of the second signal. In the following description, the first signal is a video signal of a television signal, or the like, and the second signal is a signal for displaying on the display panel.

For example, a color type of the first signal is the RGB three colors, and a color type of the second signal is the RGBW four colors. In addition, the color arrangement of the first signal is set so as to assign RGB per pixel, and the color arrangement of the second signal is set so as to assign RG or BW per pixel. The minimum unit arranged in a pixel is called the sub pixel, and the arrangement conversion by sub pixel unit is called sub pixel rendering.

In the liquid crystal panel including RGBW sub pixels for the purpose of improving transmittance, a combination of RG sub pixels or BW sub pixels is arranged as a pixel at a pixel position of the input signal. In this case, the display pixel including the RG sub pixels cannot display a B signal, and the display pixel including the BW sub pixels cannot display RG signals.

For instance, if a fine line having a line width of one pixel is displayed by a single color (one of RGB colors), the fine line cannot be displayed every one pixel, which causes deterioration of image quality. If signal processing, which suppresses the degree of image quality deterioration based on whether input signal can be displayed or not depending on the pixel arrangement of the display panel by means of converting the input signal to the display signal, is realized, it is possible to obtain sufficient effect of improving the transmittance. From the above-mentioned viewpoint, when using the RGBW panel, there are problems regarding the color signal conversion method from the RGB signals into RGBW signal containing the W signal and the pixel arrangement conversion method depending on the pixel arrangement of the display panel.

JP 60-61724 A discloses a structure of the liquid crystal panel in which RGBW four-color sub pixels are arranged in a plane. The W sub pixel does not have a wavelength discrimination characteristic and transmits light emitted from the backlight, and hence transmittance improvement effect may be expected. However, JP 60-61724 A discloses no conversion method from the RGB input signal into the RGBW output signal.

JP 2004-538523 A discloses an apparatus structure utilizing a so-called filtering process on the principle of signal processing based on frequency components as the pixel arrangement conversion method from the input signal to the display signal. In addition, JP 2004-538523 A discloses an apparatus structure utilizing gamma conversion so that the filtering process may be valid as a linear operation.

Here, the filtering process is a well-known technology defined by a convolution integral, and it is known as a natural technology to apply the filtering process to resampling of pixels. The gamma conversion is a well-known technology that is used for maintaining linearity of signal, and it is known as a typical technology to adjust a coefficient or a parameter thereof.

In order to calculate a signal value of a target pixel using the filtering process, a sum of products between decimal fraction coefficients and signal values of the target pixel and adjacent pixels is calculated. In this case, if a calculation error remains, the error is added to an image region, which causes image quality deterioration.

In order to prevent this deterioration, it is necessary that a multiplying circuit for multiplying together the decimal fraction coefficient and the input signal, an adding circuit for adding products of the multiplying operation, signal wires for transmitting signals under calculation, and the like have a sufficient number of bits.

As a simple example, in the filtering process for 3 by 3 pixels, a sum of (9) a result (12 bits each) of multiplying the input signal (8 bits) and the decimal fraction coefficient (4 bits) has 16 bits at most. This corresponds to two times the number of bits of the input signal.

Further, where sufficient image quality may not be obtained only by the above-mentioned filtering process (blurred fine line or color balance shift), JP 2004-538523 A discloses a technology for correcting a result of filtering process operation using a monochrome fine line pattern detection unit.

However, the pixel arrangement of the display panel is not considered in the correction process. As described above, the filtering process based on frequency components is effective while the filtering process is not so sufficient that the correction process is necessary. This lacks consistency in technology, and causes complication and upsizing of the circuit.

In the end, in order to realize the signal conversion circuit disclosed in JP 2004-538523 A in a practical manner, it is essential to handle the number of bits that is approximately two times larger than the input signal or the output signal by an internal circuit, which causes complication and upsizing of the circuit. In addition, JP 2004-538523 A is not directed to the display panel including W sub pixels, and does not disclose a color signal conversion method from the RGB input signal into the RGBW output signal. Further, it is not certain whether or not the generation method of the sub pixel signal disclosed in JP 2004-538523 A may be applied to signal conversion of the RGBW panel.

In addition, JP 2004-538523 A discloses the signal processing based on frequency components, which is subject to a constraint of the well-known sampling theorem. In other words, it is theoretically impossible to reproduce correctly a sub pixel signal having a shorter period (higher frequency) than a pixel period (frequency) of the input signal.

One aspect of the present invention has been made for solving the above-mentioned problems of the conventional technologies, and it is one object of the present invention to provide a technology for converting a first signal to a second signal by using a simple signal processing procedure so as to improve transmittance while maintaining image quality of a display panel having a second color arrangement.

The above-mentioned and other objects and novel features of the present invention become apparent from the following description and the accompanying drawings.

A typical aspect of the invention disclosed herein is briefly outlined as follows.

In order to solve the above-mentioned problems, according to one aspect of the present invention, a display signal conversion apparatus converts a first signal having a first color type and color arrangement into a second signal having a second color type and color arrangement (sub pixel arrangement). The display signal conversion apparatus includes a color conversion unit configured to convert the first color type into the second color type, a pattern determination unit configured to determine a pattern of one of the first color arrangement and the second color arrangement, a unit configured to determine a color arrangement (sub pixel arrangement) of a pixel position of the second signal corresponding to a pixel position of the first signal, and a sub pixel signal generation unit configured to generate a signal (sub pixel signal) having a second color combination and color arrangement based on a result of the signal pattern determination and the sub pixel arrangement.

In addition, in one aspect of the present invention, a phase between a pixel position of the input RGB signal and a sub pixel arrangement position of a display panel is constant. In other words, between input and output of the color signal, pixel arrangement intervals (i.e., the number of pixels per screen) have a relationship of an integral multiple. This corresponds, for example, to the case where any one of RG and BW sub pixels of the display panel are positioned at the pixel positions of the input signal. On the contrary, although it is not a target this time, the case where the phase is not constant corresponds to the case where the pixel arrangement intervals of the display panel (i.e., the number of pixels per screen) do not have a relationship of an integral multiple with respect to the input signal.

The conversion from the input RGB signal to the RGBW signal for display is split into two steps involving (1) color signal conversion (conversion from the RGB signal to the RGBW signal) and (2) signal conversion based on the pixel arrangement of sub pixels of the RGBW panel of the display panel (sub pixel rendering), and the two steps are performed in the order of (1) and (2).

One aspect of the present invention first performs (1) color signal conversion. As described above, it is a precondition that there is no phase shift between the input and the output of the color signal. Therefore, it is not necessary to consider the arrangement position of sub pixels at this stage. In general, the color conversion is performed by multiplying the color signal of a pixel unit that is supplied in the scanning order by a decimal fraction coefficient.

Next, in the stage (2), the RGBW signal after the color conversion performed in the above-mentioned step (1) is supplied, and the signal conversion is performed based on the arrangement position of sub pixels of the display panel. At this stage, a unit configured to determine a signal pattern of a two-dimensional arrangement of the RGBW signal in the target pixel and adjacent pixels is prepared so as to detect a fine line having high chroma saturation in particular. In addition, because there is no phase shift as described above, the positional relationship between the input signal and the sub pixels is constant. Utilizing this relationship, it is possible to determine whether or not the color type may be displayed. Further, a correspondence relationship between the above-mentioned condition and the color signal of the sub pixel positioned at the target pixel is prepared in advance for signal processing of the pixel arrangement conversion.

Further, the color signal of the sub pixel corresponding to the target pixel is generated from the RGBW signal obtained by color conversion of the input signal, the signal pattern detected from the target pixel and adjacent pixels, and the sub pixel arrangement of the RGBW panel corresponding to the pixel position of the target pixel.

Here, in the method of generating the color signal, signal processing contents based on the combination of the above-mentioned conditions are prepared in advance so that the color signal that may not be displayed depending on the sub pixel arrangement is distributed to a different pixel (sub pixel) or different color to be displayed.

As described above, the method disclosed in JP 2004-538523A uses the sum of products (integral) operation of the reference range so as to calculate the sub pixel signal of the target pixel position. In contrast, the procedure of one aspect of the present invention involves distributing the signal to a different pixel or a different color based on the signal pattern. The method disclosed in JP 2004-538523 A notes frequency components for the filtering process, and hence is subject to constraints of the sampling theorem. In contrast, according to one aspect of the present invention, the signal of the sub pixel unit may be generated without being subject to constraints of the sampling theorem.

According to one aspect of the present invention, the pixel arrangement is converted by the single procedure, and the additional correction process is not necessary although it is essential in JP 2004-538523 A. Because the multiplier (which is essential in JP 2004-538523 A) is not used as the operating unit of the above-mentioned step (2) in one aspect of the present invention, the number of bits handled by the operating circuit is approximately the same as the input signal or the output signal. In this way, the signal conversion is performed from the RGB signal to the RGBW signal by using a simple signal processing procedure, so as to improve transmittance while maintaining image quality of the RGBW panel.

Effects obtained by the typical aspect of the invention disclosed herein are briefly described as follows.

According to one aspect of the present invention, the signal conversion is performed from a first signal (for example, RGB signal) to a second signal (for example, RGBW signal) by using a simple signal processing procedure, so as to improve transmittance while maintaining image quality of a display panel (for example, RGBW panel) having a second color arrangement.

BRIEF DESCRIPTION OF THE DRAWINGS

In the accompanying drawings:

FIG. 5 is a diagram illustrating an operation of the signal pattern determination unit 153 illustrated in FIGS. 1A and 1B;

FIG. 6 is a diagram illustrating an operation of the signal pattern determination unit 153 illustrated in FIGS. 1A and 1B;

FIG. 9 is a diagram illustrating an operation of the signal distribution in the display signal conversion apparatus according to the embodiment of the present invention;

FIG. 10 is a diagram illustrating an example of a general structure of a liquid crystal display to which the display signal conversion apparatus according to the embodiment of the present invention is added as a bridge circuit;

FIGS. 11A and 11B are diagrams illustrating a structural example of a television receiver using the display signal conversion apparatus according to the embodiment of the present invention;

DETAILED DESCRIPTION OF THE INVENTION

Figure 1A:
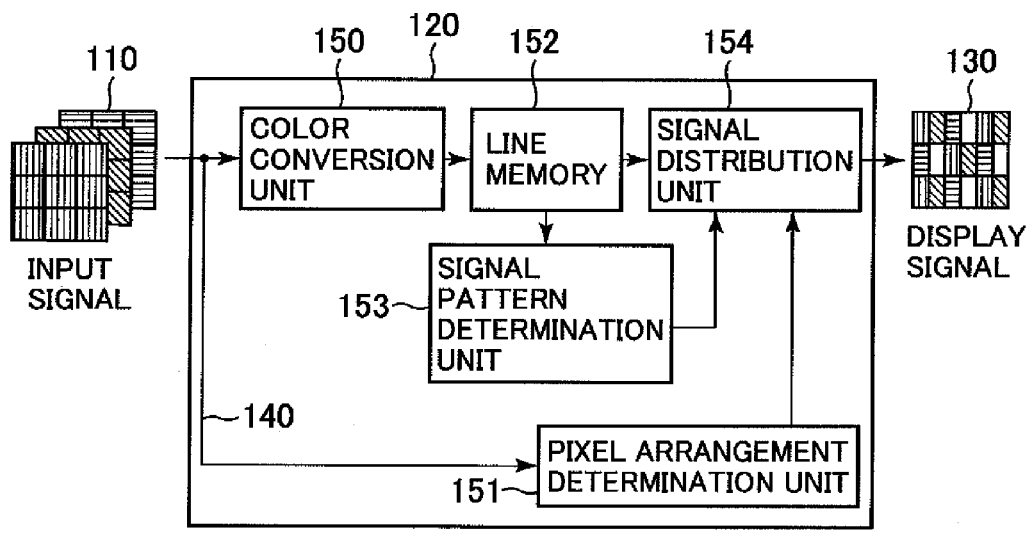
FIGS. 1A and 1B are diagrams illustrating a fundamental structure of a display signal conversion apparatus according to an embodiment of the present invention.

Hereinafter, embodiments of the present invention are described in detail with reference to the accompanying drawings.

Note that in all the drawings for illustrating embodiments, the element having the same function is denoted by the same reference numeral or symbol so that overlapping description is omitted.

Figure 1B:
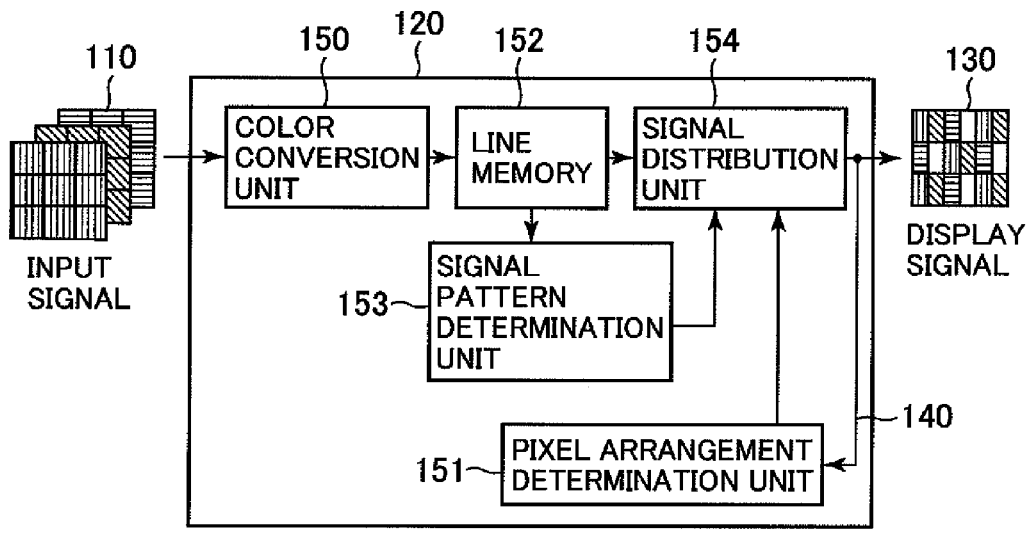
Figure 2A:
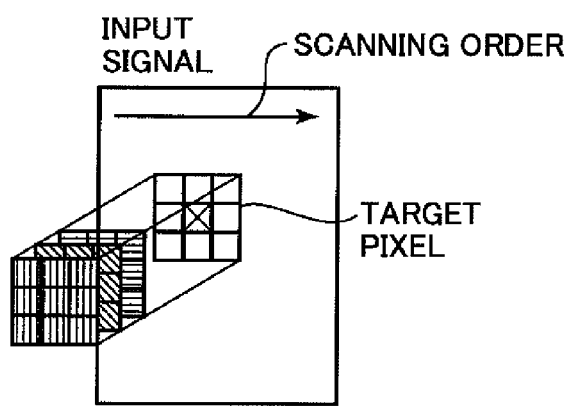
FIGS. 2A and 2B are diagrams illustrating a color type and a color arrangement that are used in the display signal conversion apparatus according to the embodiment of the present invention.
Figure 2B:
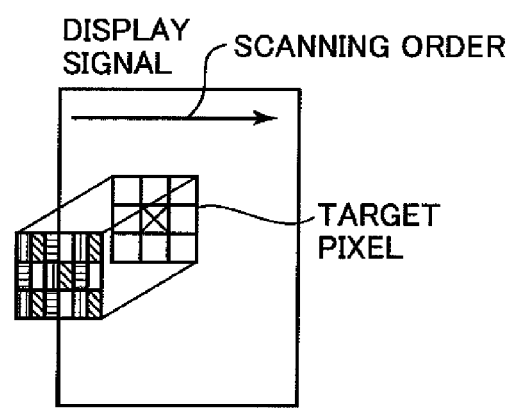

FIGS. 1A and 1B illustrate a fundamental structure of a display signal conversion apparatus according to the embodiment of the present invention. FIGS. 2A and 2B illustrate color types and color arrangements of signals that are described in the following description.

An input signal 110 that is a first signal includes RGB three colors for each pixel, and may also include a synchronizing signal 140. A display signal 130 that is a second signal includes RGBW four colors depending on the apparatus structure of the display panel.

The display panel includes RGBW four colors, and pixels each of which is a combination of RG sub pixels or BW sub pixels are arranged regularly at pixel positions of the input signal.

The display signal 130 includes color signals in accordance with the sub pixel arrangement of the display panel, and may also include the synchronizing signal 140 in some cases. The W sub pixel does not perform wavelength discrimination and therefore has transmittance that is a sum of those of sub pixels of the RGB three colors.

The transmittance when displaying white color by the RGBW four color panel is 1.5 times higher than the transmittance in the case of the RGB three color panel. Practically, there is modification or variation of numeric values in design and production of the liquid crystal panel, but the effect of improving transmittance by the W sub pixels may be expected.

In order to perform display by using the RGBW panel as described above, the display signal 130 includes a combination of RGBW four colors in accordance with the sub pixel arrangement.

The display signal conversion apparatus 120 is a unit for performing a signal conversion process of converting the input signal 110 as the first signal into the display signal 130 as the second signal. The input signal 110 is converted into the display signal 130 by the display signal conversion apparatus 120 so as to be transmitted to the display panel and output as a display screen.

The display signal conversion apparatus 120 includes a color conversion unit 150, a pixel arrangement determination unit 151, a line memory 152, a signal pattern determination unit 153, and a signal distribution unit 154.

The color conversion unit 150 converts the input signal 110 from an RGB signal into an RGBW signal.

The pixel arrangement determination unit 151 determines whether the display pixel of the display panel corresponding to the target pixel to be a conversion target includes the RG sub pixels or the BW sub pixels when converting the input signal 110 into the display signal 130 by the display signal conversion apparatus 120.

The line memory 152 is a unit for temporarily storing the RGBW signal.

The signal pattern determination unit 153 reads the RGBW signals of the target pixel and of the adjacent pixels from the line memory 152 so as to determine a signal change in the pixel region as a pattern.

The signal distribution unit 154 generates a sub pixel signal based on a result of the above-mentioned signal pattern determination and the sub pixel arrangement and based on a signal processing method prepared in advance, so as to output the sub pixel signal as the display signal 130.

The present invention may be implemented by modifying or changing the above-mentioned structure appropriately. The pixel arrangement determination unit 151 may be disposed so as to operate in synchronization with the input signal 110 as illustrated in FIG. 1A, or to operate in synchronization with the display signal 130 as illustrated in FIG. 1B.

A color filter having a certain wavelength discrimination characteristic may be disposed at the W sub pixel position of the RGBW panel. Alternatively, sub pixels of a plurality of colors that is not limited to the four colors may be disposed. The sequence of the color conversion unit 150 and the line memory 152 may be reversed so as to perform the color conversion on a signal after storing the signal temporarily in the memory. Still alternatively, the line memory 152 may be formed as a screen memory. Although not shown, a backlight may be operated with luminance modulation based on a certain condition or periodical switching of a light emission wavelength.

A structural example of the color conversion unit 150 is described. Here, the display signal 130 is generated from the RGB three colors of the input signal 110 by using the RGBW four-color sub pixels. A W signal contains spectrum in the visible range uniformly. Therefore, the W signal may be generated by replacing a signal component (that is, minimum value) contained commonly in the RGB signal by W. Further, in order to maintain the amplitude of the input signal, W is subtracted from the RGB three colors signal so as to be output. As a summary, the following equations (1) are satisfied.

$$W = \text{MIN}(R, G, B)$$

$$R' = R - W$$

$$G' = G - W$$

$$B' = B - W \quad (1)$$

If RGBW (R'G'B'W) signal obtained from the equations (1) is used as the display signal, the luminance of the display output is maintained. Therefore, the effect of improving luminance by adding W may not be obtained.

As other conversion equations for improving the situation, the following equations (2) may be used.

$$W = \text{MIN}(R, G, E)$$

$$R' = -W \times K$$

$$G' = G - W - K$$

$$B' = B - W \times K \quad (2)$$

Utilization ratio of W maybe adjusted by using the coefficient K in the equations (2). If K=1, the equations (2) are the same as the equations (1).

If importance is placed on improvement of luminance, the conversion equations (3) below may be used.

$$W = \text{MIN}(R, G, B)$$

$$R' = R$$

$$G' = G$$

$$B' = \quad (3)$$

Thus, luminance is improved compared with a case using original RGB signals.

As fundamental performances of the liquid crystal display, color reproducibility, contrast, and the like are required. However, under a situation of bright ambient environment, reflection light of external light from the surface and light emitted from the display device are mixed, which deteriorates both color reproducibility and contrast.

Therefore, in this embodiment, there is attached more importance to contrast rather than color reproducibility in the situation of bright ambient environment, so as to improve visibility of the display screen. For this purpose, the luminance improving effect by the W sub pixels is utilized, and a unit for detecting ambient brightness and a unit for generating the W signal based on the ambient brightness are provided so that a large number of W signals are generated in a brighter environment.

As the unit for detecting ambient brightness, a so-called illumination sensor may be used. By using the coefficient K that is set in accordance with ambient brightness, the RGBW signal may be calculated based on the equations (4) below.

$$W = MAX(R, G, B)$$
$$R' = R + (W-R) \times K$$
$$G' = G + (W-G)K$$
$$B' = B + (W-B) \times K \quad (4)$$

Here, if K=0, the following equations (5) are satisfied.

$$W = MAX(R, G, B)$$
$$R' = R$$
$$G' = G$$
$$B' = B \quad (5)$$

Alternatively, if K=1, the following equations (6) are satisfied.

$$W = MAX(R, G, B)$$
$$R' = MAX(R, G, B)$$
$$G' = MAX(R, G, B)$$
$$B' = MAX(R, G, B) \quad (6)$$

By adding the W signal in this way, luminance may be improved although chroma saturation is lowered. The luminance improving effect becomes highest when chroma saturation is zero, and the image becomes a monochrome (gray) image in this case. As described above, it is inevitable for the display panel viewed in a bright environment that chroma saturation is lowered because of an influence of reflection light. Therefore, it is a reasonable determination, from a viewpoint of improving visibility, to lower chroma saturation while enhancing luminance in the signal processing as described above.

In addition, as another example of controlling the W signal, there is reduction of stand-by power consumption. For instance, if the mobile terminal is not operated for a certain period or longer, it is instantaneously decided that the mobile terminal is in the stand-by state with no operation, and the method of generating the display signal for displaying on the display panel is switched.

Specifically, the display signal is generated by enhancing the utilization ratio of W in the stand-by state so as to improve the contrast at the cost of color reproducibility. Here, the conversion from the RGB input signal into the RGBW display signal may be performed by using the coefficient K that is set based on the utilization ratio of W in accordance with the equations (7) below.

$$W = MAX(R, G, B)$$
$$R' + (W-R) \times K$$
$$G' = G + (W-G) \times K$$
$$B' = B + (W-B) \times K \quad (7)$$

According to the equations (7), it is possible to realize the display screen in which contrast is weighted. In addition, backlight luminance is reduced so that power consumption may be reduced. As a combination thereof, although backlight luminance is reduced, contrast of the display signal is enhanced (utilization ratio of W is improved), so that visibility is secured. As a matter of course, if a certain operation is restarted, image quality of the display panel in the operation state is restored by preparing a procedure for getting out of the above-mentioned stand-by state. An intermediate transfer state is provided for transferring from the operation state to the stand-by state. On the contrary, transfer from the stand-by state to the operation state is performed promptly, so that temporal asymmetry is provided.

Primarily, it is essential that the signal is linear for correctly performing addition, subtraction, multiplication, and division operations. Therefore, it is reasonable from a viewpoint of linearity to perform signal processing after removing the gamma characteristic from the signal. However, the number of gradation steps may be decreased by the gamma conversion, which may cause deterioration in image quality.

For instance, it is apparent that if the signal of 8 bits and 256 gradation steps is processed by gamma conversion so as to be output as a signal of the same 8 bits, the number of gradation steps becomes smaller than 256 because a signal step width becomes uneven. As a result, a false contour may be observed in a smooth signal change region. Otherwise, balance of the RGB three colors may be lost so that another color may be observed in a white color region. In addition, there is a case where grounds of linearity of a video signal (or device characteristic) are not clear. Practically, the signal conversion may often be performed with gamma characteristic being valid. There is also a case where a large image quality deterioration is not observed even if the linearity is not satisfied. Therefore, the gamma conversion unit is not essential in the present invention.

Figure 3:
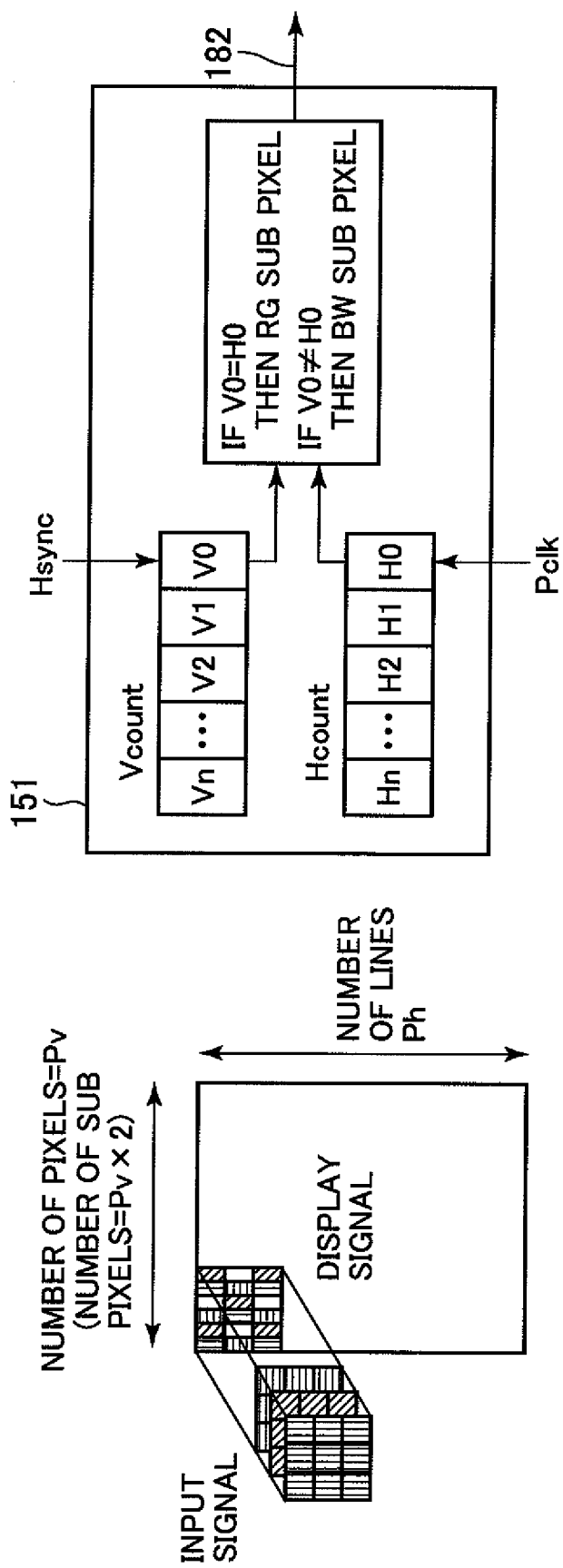
FIG. 3 is a diagram illustrating a structural example of a pixel arrangement determination unit 151 illustrated in FIGS. 1A and 1B.

FIG. 3 illustrates a structural example of the pixel arrangement determination unit 151 illustrated in FIGS. 1A and 1B. The sub pixel arrangement of the display panel corresponding to the position of the target pixel is determined in advance from regularity of the sub pixel arrangement of the display panel and a position of the target pixel calculated from the synchronizing signal 140 contained in the input signal 110, so that a sub pixel arrangement signal 182 is output.

As illustrated in FIG. 3, the display panel includes pixels arranged in the pixel positions of the input signal in combination with the RG sub pixels or the BW sub pixels. Further, the RG sub pixels are disposed at the uppermost and leftmost end in the display panel, so that RG and BW are arranged alternately in the vertical direction and in the horizontal direction.

Described below is a procedure for calculating a relationship between a pixel position of the target pixel of the input signal 110 and a sub pixel position of the display panel from a synchronizing signal 140 in association with scanning order of the input signal.

The synchronizing signal 140 includes a vertical synchronizing signal Vsync, a horizontal synchronizing signal Hsync, and a pixel clock Pclk. In addition, the number of lines per screen of the input signal 110 is denoted by Ph, and the number of pixels per line is denoted by Pv.

Similarly, regarding the display panel, the number of lines per screen is denoted by Ph, and the number of pixels per line is denoted by Pv. Write scanning is started from the upper left end.

A line number counter Vcount is counted up by the horizontal synchronizing signal Hsync and is reset by the vertical synchronizing signal Vsync. A pixel number counter Hcount is counted by the pixel clock Pclk and is reset by the horizontal synchronizing signal Hsync.

At the start point of the upper left end in the display panel, the line number counter Vcount is reset by the vertical synchronizing signal Vsync while the pixel number counter Hcount is reset by the horizontal synchronizing signal Hsync so that both counters become zero.

The circuit for realizing the above-mentioned operation may be easily realized by combining binary counters and the like. In this case, a relationship between the counter value and a position of the sub pixel of the display panel is as follows. If the least significant bit V0 of the line number counter Vcount and the least significant bit H0 of the pixel number counter Hcount are the same, the pixel is an RG sub pixel. If V0 and H0 are not the same, the pixel is a BW sub pixel.

The program is described as the expression (8) below.

IF(V0=H0) THEN RG SUB PIXEL

IF(V0=H0) THEN BW SUB PIXEL    (8)

In this way, the sub pixel arrangement information may be generated from the regularity of the preset sub pixel arrangement and the synchronizing signal contained in the input signal.

The above-mentioned description exemplifies the case where the synchronizing signal 140 contained in the input signal 110 is used. Alternatively, it is also possible to use the synchronizing signal 140 contained in the display signal 130 on the output side. There is a time shift between the input side and the output side due to an internal circuit structure, but they may be handled in the same manner. The regularity of the sub pixel arrangement may be input from the display panel by providing a unit for holding a certain negotiation when the display panel is connected.

A structural example of the signal pattern determination unit 153 illustrated in FIGS. 1A and 1B is described. In the conversion from the input signal of the target pixel set in accordance with the scanning order into the display signal, the signal pattern of the input signals of the target pixel and adjacent pixels is determined with reference to the sub pixel structure of the display panel for displaying the input signals of the target pixel and adjacent pixels read from the line memory 152 and the target pixel output from the pixel arrangement determination unit 151.

In the display panel constituted of the RGBW four colors, a combination of the RG sub pixels or the BW sub pixels is arranged at the pixel position of the input signal alternately for each line.

There is a color that may not be displayed, depending on the sub pixel arrangement of the display panel. For instance, when displaying a fine line having the minimum line width of one pixel, the line may be broken to be in pieces so that image quality deterioration may be caused. This image quality deterioration of the fine line is apt to occur particularly in a case where the fine line has a chromatic color.

In this embodiment, in order to prevent the above-mentioned image quality deterioration, it is judged first whether or not the input signal has a signal pattern that is apt to cause the image quality deterioration.

Here, it is assumed that the input signal has 8 bits for each of the RGB three colors (24 bits in total) per pixel and that the display signal has 8 bits for each sub pixel. For instance, it is necessary to refer to the target pixel and adjacent pixels that are arranged in a two-dimensional manner for determining whether or not a fine line exists. If a reference region has 3 by 3 pixels, there are signal patterns in which signals of 9 pixels including the target pixel and adjacent pixels are combined. If each pixel has a signal of 24 bits of the RGB three colors, there are types of ninth power of 24. If each pixel has a signal of 32 bits of the RGBW four colors, there are types of ninth power of 32. However, it is not necessary to handle a signal pattern that is not necessary for maintaining the image quality. Therefore, pattern types are reduced while keeping a signal pattern that is effective for maintaining the image quality.

Here, the RGBW input signal is binarized using a threshold value so as to be converted into one bit signal. As a result, the signal of the 9 pixels is converted into a combination of 9 bits, and total 512 types of patterns are generated. Further, because only the signal patterns that are effective for maintaining the image quality are selected from the all types of the signal patterns and are used, the pattern types to be actually handled is reduced. In other words, the signal pattern that is apt to cause the image quality deterioration is discriminated. One of the feature of this embodiment is that the threshold value is set so that a background color and a foreground color are discriminated from each other for enhancing accuracy of the determination.

Figure 4:
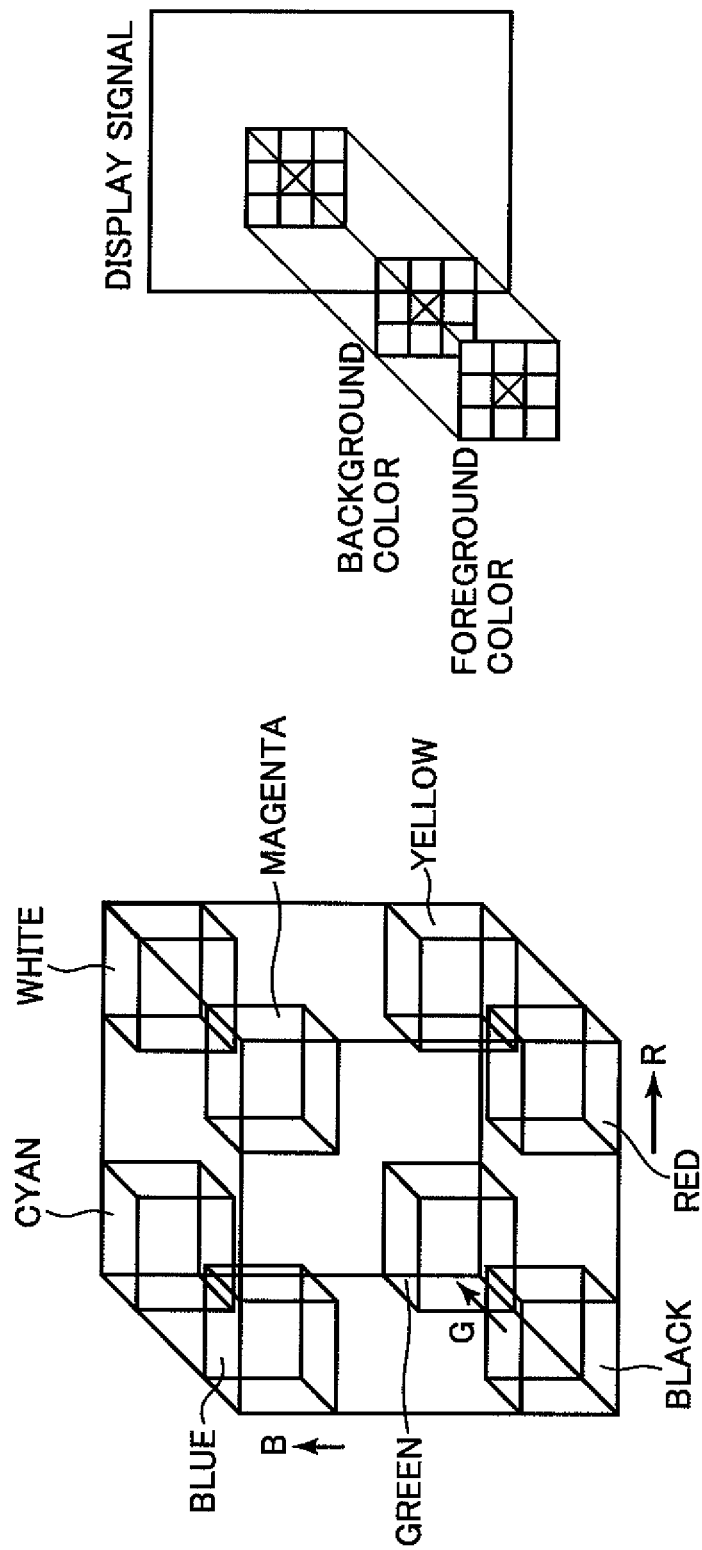
FIG. 4 is a diagram illustrating an example of how to set a threshold value in the three-dimensional color space in the case of the RGB three colors.

The threshold value is set by a combination of colors, and hence it is easily understood by considering in the color space. FIG. 4 illustrates an example of how the threshold value is set in the three-dimensional color space in the case of the RGB three colors. The color space of the RGBW four colors is four-dimensional and may not be illustrated, but the same is true for the RGBW four colors. The threshold value for identifying yellow is set to have a large value for RG colors and a small value for BW colors. The threshold value for identifying black is set to have a small value for each of the RGBW colors. The values may be in arbitrary sizes, a shape of a line (or a plane) connecting the values may also be set arbitrarily.

The input signal is binarized by two types of threshold values for the background color and the foreground color so that two binary signal patterns are generated for the background color and the foreground color.

If the signals have exclusive pixel arrangements, the pixel region has a signal pattern of the background color and the foreground color. On the contrary, if the signals do not have an exclusive pixel arrangement, the signals are excluded because another color is mixed.

Next, it is determined whether or not the pixel arrangement is a specific judgment pattern that is prepared in advance. The above-mentioned RGBW panel has a low resolution in the horizontal direction, and hence smoothness in the vertical direction of the fine line is apt to be lost. Therefore, for example, the 3 by 3 pixels including a vertical line may be prepared as the judgment pattern. Then, if the pixel arrangement matches the pattern, the process proceeds to the signal processing procedure for maintaining the image quality. In the above description, the background color is yellow while the foreground color is black in the described pattern However, an arbitrary combination of the background color and the foreground color may be adopted.

The above-mentioned procedure may be performed by using a combination circuit of a comparator for comparing the input signal with the threshold value, and an AND gate for judging matching between the binary signal that is an output of the comparator and a pattern that is prepared in advance. The signal pattern that is prepared in advance may be incorporated as a memory circuit or a fixed constant in the circuit.

One of the feature of this embodiment is that the signal pattern determination unit 153 is used for detecting the pixel arrangement in which the background color and the foreground color included in the input signal are combined so that the color signal conversion for a purpose of maintaining the image quality is performed in the structure in which color signal display is enabled or disabled depending on the sub pixel arrangement of the display panel.

FIG. 5 is a diagram for illustrating an operation when a fine line in the vertical direction included in a letter or a figure of black pixels in the yellow color background is displayed. In order to display black by the RGBW panel, it is sufficient to turn off the drive signal simply in both the RG sub pixels and the BW sub pixels. In order to display yellow color, the drive signal should be turned on in the RG sub pixel position, but it cannot be displayed in the BW sub pixel position.

As a combination of the above-mentioned structures, it is described that a case where a fine line of black color is a foreground in a yellow color background. When the black color fine line is displayed by turning off the BW pixel, the background pixels sandwiching the black color fine line may display yellow color because they are the RG pixels. In this case, the black color fine line has a line width of one pixel. When the black color fine line is displayed by turning off the RG pixel, the background pixels sandwiching the black color fine line may not display yellow color because they are the BW pixels. In this case, the black color fine line is observed as a line having a line width of three pixels.

Thus, the black color fine line alternately has the line width of one pixel and the line width of three pixels. Consequently, the result of displaying is different from a smooth black line of the minimum line width (one pixel) intended by the input signal.

One of the feature of this embodiment including a unit for generating the sub pixel signal so as to display a smooth black line based on a detection result and so as to be observed as if a smooth black line is displayed when signals are input as described above.

In this embodiment, in order to detect a color signal, a region of a color space represented by a combination of RGB or RGBW threshold values is set. In order to detect yellow, a large threshold value is set for RG colors while a small threshold value is set for BW colors in the color space.

In order to detect black color, a small threshold value is set for each of the RGBW colors in the color space. If the color signal belongs to color space region indicated by the threshold values, the color signal is yellow color or black color. Then, two-dimensional positions of the yellow color pixel and the black color pixel are detected with respect to the target pixel and adjacent pixels. The pixel positions of the background color and the foreground color are exclusive to each other, which are indicated by an inverting relationship of a binary signal.

A judgment pattern for the background and a judgment pattern for the foreground that is invert of the pattern for the background are prepared for a predetermined pixel arrangement, and it is detected whether the background of the yellow color pixels as well as the foreground of the black color pixels both match the prepared judgment patterns. If matching is detected for both, it is determined that the judgment pattern is satisfied.

As to the judgment pattern, for example, in the 3 by 3 pixel region with the target pixel being the center pixel, there are seven types of judgment patterns for the black color fine line constituting a letter or a figure. Further, it is arbitrary to enlarge the pixel region or to add a judgment pattern of a signal arrangement (not shown).

A logic circuit is prepared for outputting the seven types of judgment patterns when a binary signal indicating an arrangement of the background color and the foreground color of nine pixels is input. The judgment patterns are not limited to the seven types in the above-mentioned example, but may be set appropriately, and the logic circuit is adapted for detection based on the judgment patterns thus set. The logic circuit may be realized easily by combining so-called AND circuits. A result of the determination may indicate matching commonly for all the judgment patterns or indicate matching independently for each of the judgment patterns. In either case, the signal processing is performed based on the determination of the matching.

FIG. 6 is a diagram illustrating an operation in a case where the input RGB three color signals represent image data in which white color and black color are arranged alternately. In order to detect white color, a large threshold value is set for each of the RGBW colors in the color space. In order to detect black color, a small threshold value is set for each of the RGBW colors in the color space.

A white color pixel position is detected by using a threshold value of the RGB combination for detecting white color, and a black color pixel position is detected by using a threshold value of the RGB combination for detecting black color. If a color signal belongs to the color space region indicated by the threshold values, the color signal represents white color or black color.

A relationship between the input monochrome arrangement position and the arrangement position of the RG pixel or the BW pixel of the RGBW panel leads to a case where the input white pixel corresponds only to the RG pixel of the display panel or an opposite case where the input white pixel corresponds only to the BW pixel of the display panel. If the display panel is driven as it is in these cases, yellowish color is generated in the former case while bluish color is generated in the latter case, so that white color may not be displayed in both cases.

Here, assuming that density of pixels in the display panel is sufficiently high, when displaying the image data in which white color and black color are arranged alternately, its arrangement pattern has no meaning, and it has a meaning in that the gray color as achromatic color is displayed. Therefore, in this embodiment, based on a criterion that is whether white color and black color are arranged alternately in the pattern, if the criterion is satisfied, R=0, G=0, B=0, and W=1 are output as the display signal. In this case, the RGB sub pixels do not contribute to displaying, and no color is generated so that achromatic color is displayed.

In general, a region in which pictures, letters, figures, and the like are disposed in image data is often sufficiently larger than the 3 by 3 pixels. On the other hand, the signal pattern may be determined incorrectly based on observing the region as small as 3 by 3 pixels.

Therefore, in order to avoid the incorrect determination, it is possible to add a condition that a single reference pixel region (3 by 3 pixels in the above-mentioned example) is set to be larger or that the same judgment results consecutively obtained in the adjacent regions.

Whether or not the region is continuous may be simply realized by providing a counter for counting the number continuing the same judgment pattern on the same line. Alternatively, the judgment result of the single reference pixel region for one screen is temporarily stored in the memory so that the region of the same judgment result continuous in the vertical direction and in the horizontal direction in the screen may be detected. Thus, incorrect determination may be reduced through determination made on a region larger than the region used for the single determination (3 by 3 pixels in the example described above).

In the above description, the conversion from the input RGB signal to the RGBW signal for display is split into two steps including (1) color signal conversion (conversion from the RGB signal to the RGBW signal) and (2) signal conversion based on the pixel arrangement of sub pixels of the RGBW panel of the display panel (sub pixel rendering), and is performed in the order of (1) and (2).

As another structural example, it is possible to adopt a process procedure in which the signal of the RG sub pixels or the BW sub pixels is generated directly from the RGB input signal based on a result of the signal pattern determination. In other words, it is possible to adopt a structure in which the signal of the RG sub pixels or the BW sub pixels is generated considering the sub pixel structure of the RGBW panel from the beginning.

This may be realized by combining the above-mentioned steps (1) and (2) so as to structure the circuit. It is needless to say that the same result, as one of the object of the present invention, may be obtained by either structure.

Figure 7:
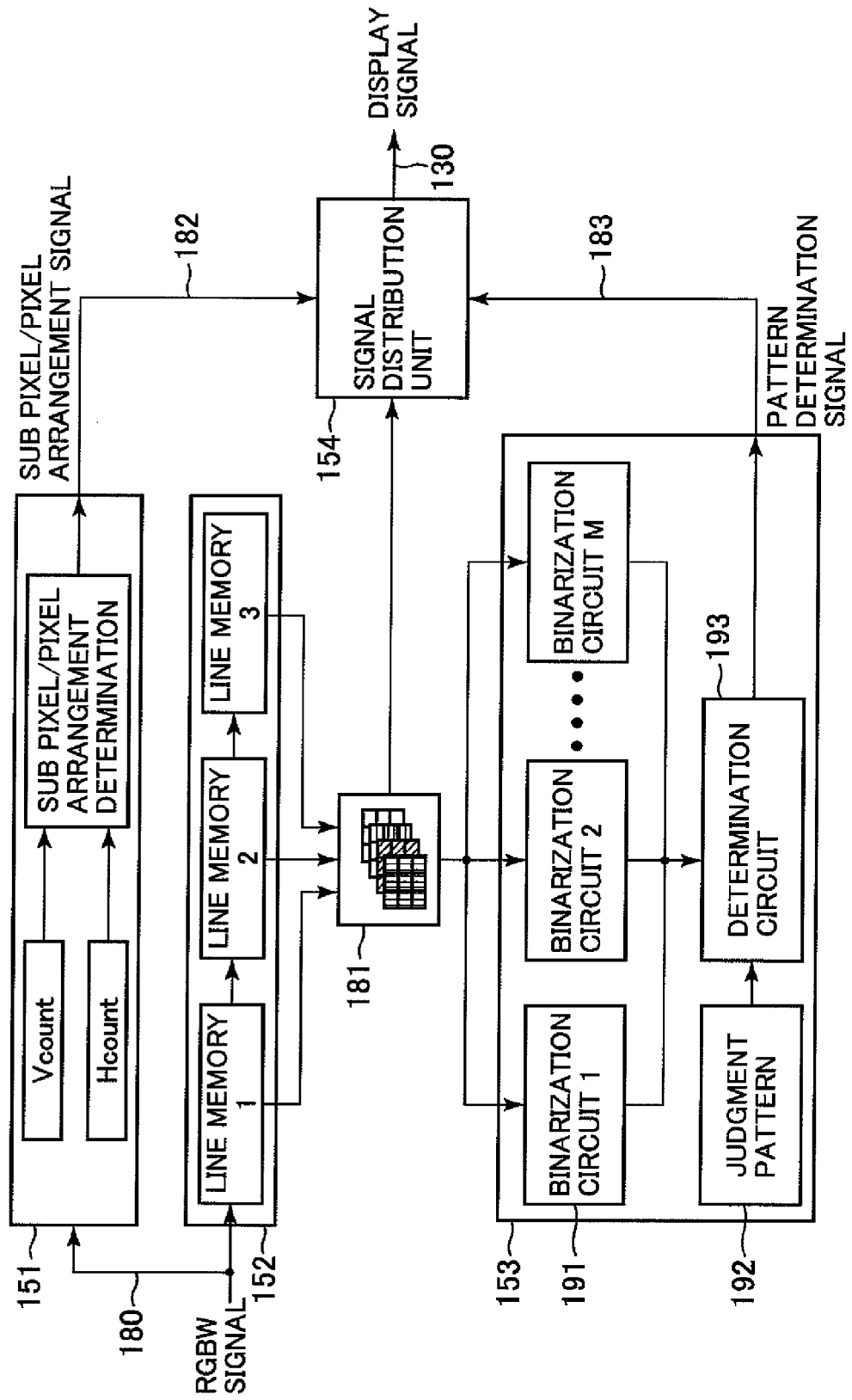
FIG. 7 is a diagram illustrating a circuit structural example of the pixel arrangement determination unit 151, a line memory 152, a signal pattern determination unit 153, and a signal distribution unit 154 illustrated in FIGS. 1A and 1B.

FIG. 7 illustrates an example of the circuit structure of the pixel arrangement determination unit 151, the line memory 152, the signal pattern determination unit 153, and the signal distribution unit 154 illustrated in FIGS. 1A and 1B. Here, the RGBW signal 180 which has already been converted by the color conversion unit 150 is input.

The RGBW signal 180 after conversion performed by the pixel unit in accordance with the scanning order is temporarily stored in the line memory 152. Here, a three-line structure is adopted so that the reference signal 181 of the 3 by 3 pixels region is generated from the signal read from the line memory 152. Then, the signal arrangement of the pixel region is determined by the signal pattern determination unit 153.

Here, as described above, there are so many combinations of signals in this state. Therefore, by utilizing a binarization circuit 191 using a threshold value, the signal is converted into a combination signal of the background color and the foreground color. A plurality types of threshold values may be set, and M binarization circuits 191 from (1) to (M) are illustrated in FIG. 7. Each binarization circuit works so as to indicate whether or not the RGBW signal of each pixel belongs to a specific region in the color space, as a binary signal.

A determination circuit 193 detects whether the judgment pattern 192 that is prepared in advance matches with the combination signal of the background color and the foreground color of the above-mentioned result, and a pattern determination signal 183 is output. When determined that it is not matched, the pattern determination signal 183 indicating no matching is output. The judgment pattern 192, which is prepared in advance as a plurality types of patterns that cause image quality deterioration, like black lines in a yellow color background, a white and black alternating pattern, or the like, is stored in the memory for example or is installed as a logic circuit.

It is assumed that the input RGBW signal 180 is synchronized with the synchronizing signal indicating the scanning order. Therefore, a pixel position in the screen may be determined by counting based on the synchronizing signal. In addition, a color type of the sub pixel may be determined from the sub pixel position in the display panel. The pixel arrangement determination unit 151 is a circuit for implementing the above-mentioned operation, which receives the synchronizing signal and outputs the sub pixel arrangement signal 182.

Using the pattern determination signal 183 and the sub pixel arrangement signal 182 obtained as described above, the signal distribution unit 154 generates a sub pixel signal.

As described above, a specific content of the signal processing may be described directly as a method of generating the sub pixel signal corresponding to a combination of the pattern determination signal 183 and the sub pixel arrangement signal 182.

Next, a manner of operation of the signal distribution unit 154 is described. The signal distribution unit 154 receives the RGBW signal 180 in the reference region read from the line memory 152, the sub pixel arrangement signal 182, and the pattern determination signal 183.

Figure 8B:
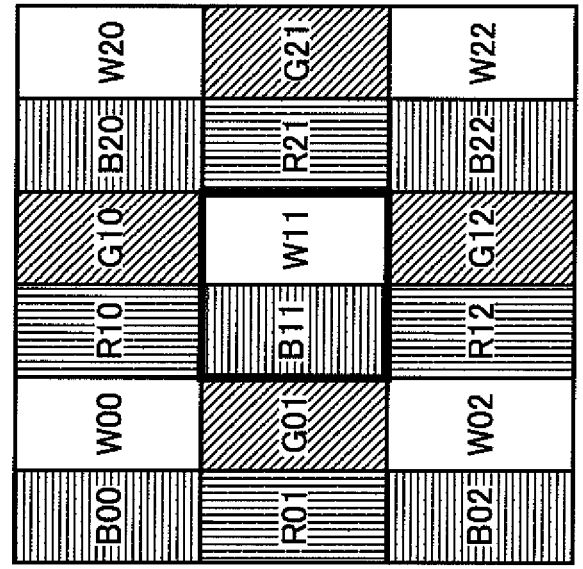
FIGS. 8A and 8B are diagrams illustrating a pixel (sub pixel) arrangement of the display panel.
Figure 8A:
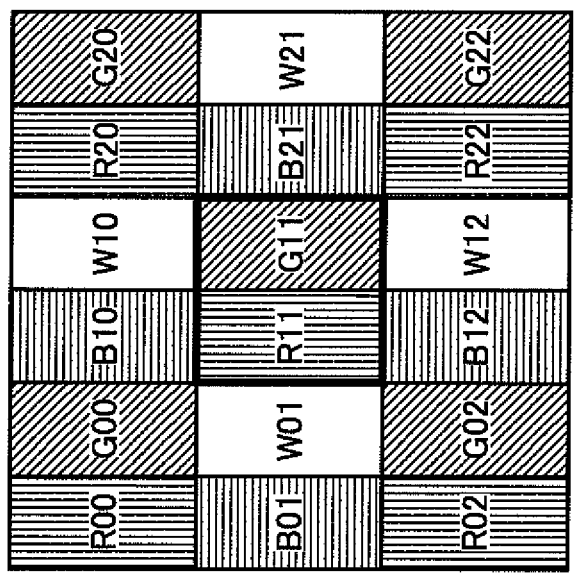

FIGS. 8A and 8B illustrate an arrangement of the pixels (sub pixels) on the display panel. It is clear that an enabled or disabled state of displaying a color type exists depending on the sub pixel corresponding to the position of the target pixel. This enabled or disabled state of display is switched alternately along the arrangement of pixels. For instance, a fine line constituting a letter or a figure may be broken in pieces in accordance with the alternating enabled and disabled state of display, which largely deteriorates visibility.

In this embodiment, a color signal in the disabled state of display is substituted by a different pixel or a different color so that the image quality deterioration of being broken in pieces may be prevented. In other words, the color signal in the disabled state of display is distributed to a different pixel or a different color, and hence it may be called signal distribution.

In this embodiment, the above-mentioned sub pixel structure and the signal pattern are input so that a method of the signal distribution is determined. A relationship between them is prepared in advance by using a table form, a program description, a built-in circuit, or the like.

An example of the signal distribution of the one-dimensional region is described with reference to the program description. Note that the contents of description may be easily rewritten by using a language for circuit synthesis such as VHDL or Verilog. IF (black color fine line exists in yellow color background)
 //determination of signal pattern}
 IF (target pixel==RG sub pixels)//RG sub pixels display enabled
  THEN{process 1}//distribute BW signal to adjacent pixels
 IF(target pixel==BW sub pixels)//BW sub pixels display enabled
  THEN{process 2}//distribute RG signal to adjacent pixels}

The process content for maintaining image quality when the conditions match may be described in the { } of "THEN{process}". An example of the program description is as follows. process 1:{
 W01<=(R11+G11)/2;
 B21<=G11/4;
 //yellow color background may not be displayed in adjacent pixel (BW sub pixels),
 //black color fine line may be displayed in target pixel (RG sub pixels)
 //in this state, adjacent three pixels become black color display and hence line width increases,
 //so adjacent W and B sub pixels are tuned on instead of yellow color background. }process 2:{
 NOP; //no operation
 //yellow color background may be displayed in adjacent pixel (RG sub pixels),
 //black color fine line may be displayed in target pixel (BW sub pixels),
 //in this state, black color fine line in yellow color background may be displayed.}

The above-mentioned feature is to describe the signal processing method for preventing the deterioration when it is determined that the image quality deterioration occurs, as a direct operation. In this embodiment, the signal processing for preventing the image quality deterioration describes the signal generating method by the sub pixel unit that is thinner than one pixel of the input signal, to thereby prevent the deterioration effectively. This is largely different from the case of the filtering process noting frequency components in which a signal change corresponding to one pixel period of the input signal may not be handled correctly because of constraints of the sampling theorem.

It is needless to say that any order of the description of the combination of the conditions may be adopted. Addition and modification of the conditions and the process contents may be performed if necessary. The determination of conditions may be realized by a simple combination of AND circuits. If the process contents exemplified above are used commonly in the judgment results of the different conditions, it is possible to obtain the effect of reducing a scale of the circuit.

FIG. 9 illustrates an operation of the signal distribution of the above-mentioned one-dimensional region. Here, FIG. 9 illustrates the case, where the input signal of the fine line (having a line width of one pixel) in which the background color is a yellow color and the foreground color is a black color. (In the graphs of FIG. 9, for easy observation, a small height is also given to the signal value of zero.) In addition, as the sub pixel position on the display panel corresponding to the target pixel, the left side of FIG. 9 is the RG sub pixels while the right side thereof is the BW sub pixels. The upper row of FIG. 9 indicates the input signal, the middle row of FIG. 9 indicates the display signal obtained by the simple conversion based on the sub pixel arrangement, and the lower row of FIG. 9 indicates the display signal obtained by the signal distribution of this embodiment.

(1) The case where the target pixel corresponds to the RG sub pixels

If the target pixel and the RG sub pixels are simply associated with each other, the sub pixel signals of the three middle pixels become zero, and hence the line width changes from one to three. Therefore, in order to maintain the image quality, an apparent line width is made to be narrow by the following process contents as described above.

Originally, as illustrated in graphs in the middle row of FIG. 9, R and G input signals disposed at the positions of W01 and B21 are discarded because there are no corresponding sub pixels of the same color. However, in this embodiment, as illustrated in the graph in the lower row of FIG. 9, the signal is distributed to W01 and B21 that are different colors, for a purpose of maintaining the fine line. Because of a very small region, luminance is perceived visually more than a difference of color so as to contribute to maintaining the line width of the fine line. process 1:{

W01<=(R11+G11)/2; B21<=G11/4;}

(2) The case where the target pixel corresponds to the BW sub pixels

If the target pixel and the BW sub pixels are simply associated with each other, the sub pixel signal of the center one pixel becomes zero, and hence the line width of one pixel may be maintained. Therefore, even if the patterns match, no special process should be performed from the sub pixel arrangement condition. Therefore, the process contents may be described as follows. Here, the simple signal conversion illustrated in the middle row of FIG. 9 and the signal conversion of this embodiment illustrated in the lower row of FIG. 9 generate the same sub pixel signal. process 2:{NOP;

//no operation}

This embodiment sets the generating method of the sub pixel signal directly as described above, and hence the signal conversion for preventing image quality deterioration may be performed by single sub pixel unit. Contents of the signal processing corresponding to factors of the image quality deterioration should be prepared arbitrarily. The signal distribution in the one-dimensional region is described above, but the distribution may be performed in the two-dimensional region, and the generating method of the sub pixel signal may be described similarly.

This signal processing is not related to the sampling theorem that becomes constraints in the signal processing handling frequency components. Note that the circuit structure for realizing the above-mentioned description may be rewritten by using a language such as VHDL or Verilog for circuit synthesis so that a logic circuit may be obtained easily, although not illustrated.

FIG. 10 illustrates an example of a general structural of the liquid crystal display to which the display signal conversion apparatus of this embodiment is added as a bridge circuit. A fundamental circuit of the display is a combination of a panel drive unit 161 (so-called driver IC) and a display panel 162. The RGBW panel is connected to the fundamental circuit, and the display signal conversion apparatus of this embodiment is connected to the input side thereof, to thereby display the RGB input signal on the RGBW panel. The circuit form is disposed between the existing RGB signal and the existing driver IC, and hence it may be called a bridge circuit. In addition, a backlight drive unit 163 and a backlight 164 are prepared.

A W utilization ratio setting unit 155 is a unit for setting utilization ratio of W in the display screen by using a signal characteristic such as chroma saturation, luminance, and the like obtained by measuring the input signal, and brightness of the environment measured by the external light sensor.

The input signal characteristic and the environmental brightness are used as a selection or a parameter of the signal conversion method in the conversion from the input RGB signal to the RGBW signal. For instance, if the environment is dark, the W signal is suppressed so that the color reproducibility is enhanced. If the environment is bright, the W signal is increased so as to realize a bright display. In addition, if an image region with high chroma saturation is included, the signal conversion is performed so as to suppress the W signal to be low for enlarging the color range of the display.

In particular, if the W signal is increased in a display screen in which the yellow color region and the white color region are mixed, yellow color may be observed to be dark. Therefore, if such a color combination exists, the W signal is suppressed to be low so that the visibility of yellow color may be improved.

In this embodiment, the W utilization ratio setting unit 155 is provided so that the corresponding utilization ratio of W is determined from a combination of the input signal characteristic and the environmental brightness. Thus, the improvement of the image quality as described above may be realized. The utilization ratio of W determined in this way is used as a coefficient or a parameter for signal conversion in the color conversion unit 150 for generating the RGBW signal. It is needless to say that the W utilization ratio setting unit 155 and the color conversion unit 150 described above may be constituted as one circuit or a plurality of circuits in accordance with convenience of design and manufacture.

The RGBW signal obtained by the conversion is temporarily stored in the line memory 152 so as to secure an N×N pixel region about the target pixel. Otherwise, a screen memory may be used. The signals of the target pixel and adjacent pixels are read from the line memory 152, and the signal pattern determination unit 153 of the region performs the pattern determination.

If the RGBW signal has 8 bits for each color, the number of combinations becomes fourth power of 8, and hence the determination circuit becomes a large scale. Therefore, the signal of each color is binarized by an appropriate threshold value so that the pattern types are reduced. Thus, the circuit structure of the pattern determination may be simplified. The sub pixel signal corresponding to the position of the target pixel is generated from the pattern judgment result and the sub pixel arrangement by using the signal distribution unit 154. This generating method may be determined in advance. The sub pixel for generating the signal may be the sub pixel corresponding to not only the target pixel but also the adjacent pixel. The generated sub pixel signal is output as a signal for displaying and is transmitted to the RGBW panel via the panel driving circuit for the display operation.

Here, the luminance modulation of the backlight may be performed at the same time. For this purpose, backlight luminance necessary for display is calculated by using a result of measuring signal distribution of the input RGB signal or the RGBW signal for displaying. Then, the backlight drive unit 163 generates the drive signal based on pulse width modulation (PWM), for example, so as to drive the backlight 164. Although not illustrated, a unit for modifying the display signal so as to be combined with the set backlight luminance for display is prepared.

As another embodiment, a structural example of a television receiver utilizing the RGBW panel is described. As fundamental requirements as a display, there are reduction of power consumption, increase of contrast, improvement of color reproducibility, and the like. In addition to them, as a specification unique to a television, many pixels are arranged in a large screen. The screen resolution of a high-definition television has pixels of 1,920 by 1,080 at most.

On the other hand, there are various signal resolutions of the video signal, and the signal resolution is different between an analog television and a high-definition television. In addition, the video signal resolution is different between terrestrial digital broadcasting and BS digital broadcasting.

In this way, it is well known that, as to a television, the signal resolution of the video signal is different from the screen resolution of the display panel, and it is a well-known technology to use resolution conversion for solving the above-mentioned problem.

In this embodiment, as one type of the above-mentioned resolution conversion, the display panel in which the RGBW sub pixels are arranged is used so as to insert the signal conversion from the input RGB signal to the display signal for the RGBW sub pixels. FIGS. 11A and 11B illustrate a structural example of a television receiver. As illustrated in FIGS. 11A and 11B, the television receiver includes a TV tuner 131, a letter/figure generation unit 132, and a screen synthesis unit 133.

It is rare that a usual television video signal contains a signal of a minimum line width corresponding to only one pixel of the display device. This is because of a resolution characteristic of a camera or a factor that a letter or a figure to be superimposed and synthesized is relatively large.

On the other hand, the video signal of a letter or a figure such as a program table or a menu created in the television set may have an arbitrary line width by setting in the generation circuit inside. Therefore, if the internally generated video signal is created so as to have substantially the same frequency characteristics as those of the broadcasting video signal, visual feelings about resolutions of them displayed on the display may be matched with each other.

In this embodiment, the minimum line width of a letter or a figure of the internally generated chromatic color is set to be larger than one pixel. Specifically, the minimum line width of a letter or a figure of the internally generated chromatic color is set so that the sub pixels of all color types of the display panel are included on the line width of the fine line when the fine line is displayed.

In the example of the above-mentioned pixel arrangement of the RGBW sub pixels, the minimum line width corresponds to one pixel in the vertical direction and two pixels in the horizontal direction. When the minimum line width is set in this way, all the RGBW sub pixels are included on the line width. Therefore, a letter or a figure of an arbitrary color may be displayed.

On the other hand, a fine line of black color may be displayed even by the single sub pixel, but in order to keep a balance of the line width with the fine line of a chromatic color, it may be the same value as the minimum line width of the chromatic color.

If the minimum line width is set in this way, color reproducibility of the fine line may be improved.

In addition, if a signal correction is performed by the above-mentioned signal pattern determination, it is possible to realize the effect of improving the image quality in which smoothness of the fine line is enhanced. It is needless to say that the above description exemplifies the television as an application, but the present invention may be applied to other display devices. For instance, if a monitor screen of a mobile terminal, a digital camera, or the like includes the RGBW panel of the above-mentioned sub pixel arrangement, it is possible to realize a display having improved visibility enhanced in which a letter or a figure of an internally generated operating screen is made to have a minimum line width of at least one pixel in the vertical direction and two pixels in the horizontal direction.

As one technology for realizing low power consumption, there is a known technology of modulating the backlight luminance based on brightness of ambient environment and contents of the video signal. Supposing that the screen size is large in an application for television, it is relatively easy to divide the backlight into a plurality of regions in the screen. Then, by luminance modulation for each region, it is possible to obtain effects of improving contrast, reduction of power consumption, and the like.

The display output that passes through the W sub pixel of the liquid crystal panel depends on the light emission wavelength of the backlight. Strictly speaking, wavelength characteristics of the liquid crystal element are added, but it is omitted for easy description. On the other hand, the RGB sub pixels become the display output in which the light emission wavelength of the backlight is combined with the transparent wavelength of the sub pixel. Here, in order to realize reduction of power consumption, improvement of contrast, improvement of color reproducibility, and the like, which are required to the display, it is possible to devise the backlight characteristic in addition to improvement of the characteristics of the liquid crystal panel.

In order to reduce the power consumption, it is effective to calculate minimum light emission quantity necessary for display the input signal so as to modulate the backlight luminance for driving. The backlight luminance modulation is effective for improving contrast because the maximum luminance is maintained while the minimum luminance in the dark screen is suppressed to be low. In addition, if the light emission wavelength distribution of the backlight is appropriately adjusted, the effect of enlarging color reproducing range is obtained. The above-mentioned structure may be used in combination with the display panel having the RGBW sub pixel structure.

Figure 12:
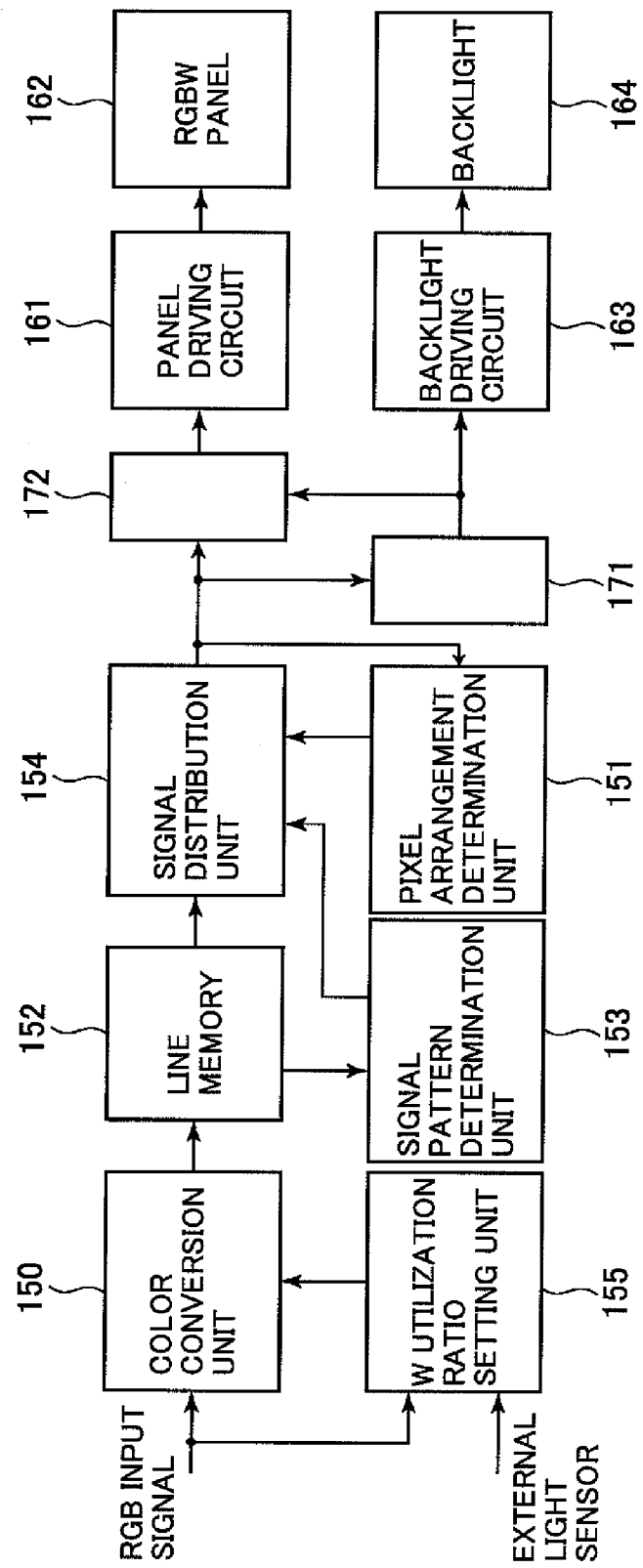
FIG. 12 is a diagram illustrating a structural example of an apparatus for performing luminance modulation of a backlight by using the display signal conversion apparatus according to the embodiment of the present invention.

FIG. 12 illustrates an example of an apparatus structure for performing the backlight luminance modulation. In this embodiment, the signal for driving the display panel is generated by the signal distribution unit 154. Therefore, the signal is input to a backlight luminance setting unit 171 so as to calculate the backlight luminance necessary for the screen display.

Then, in order to maintain the luminance of the display screen while using the calculated backlight luminance, the display signal is corrected by using the display signal correction unit 172. Thus, the image quality is maintained by the combination of the backlight and the display panel while the power for driving the backlight is reduced. In addition, the backlight luminance is reduced for a dark screen, and hence the effect of improving contrast is obtained.

Note that, although not illustrated, it is possible to prepare an illumination sensor so as to adjust the backlight luminance based on environmental brightness. Further, although not illustrated, information of color type and color arrangement of the display panel is transmitted to the backlight luminance setting unit 171 and the display signal correction unit 172 in advance. The color type and the color arrangement of the display panel are not limited and are arbitrary.

The light source unit of the backlight is not limited and may be, for example, a white color LED, a combination of RGB three color LEDs, or a combination of light sources of four or more colors. In addition, the backlight luminance may be controlled integrally in the entire screen or in each of appropriately divided regions. The signal processing unit for maintaining color reproducibility is prepared in the backlight luminance setting unit 171 and the display signal correction unit 172, and hence image quality is maintained while power consumption for driving the backlight may be reduced.

The present invention does not restrict the color type of the sub pixel of the display panel. In the above-mentioned embodiment, the RGBW four color display panel with the additional W sub pixels is described, but it is possible to add sub pixels with a color filter of cyan, yellow, or the like instead of W (white). In addition, the number of colors is not limited to four colors and may be five colors, six colors, or the like. In either case, the signal processing of generating the sub pixel signal according to this embodiment is performed based on the rule of the sub pixel arrangement, and hence improvement of transmittance or color reproducibility may be achieved.

Figure 13B:
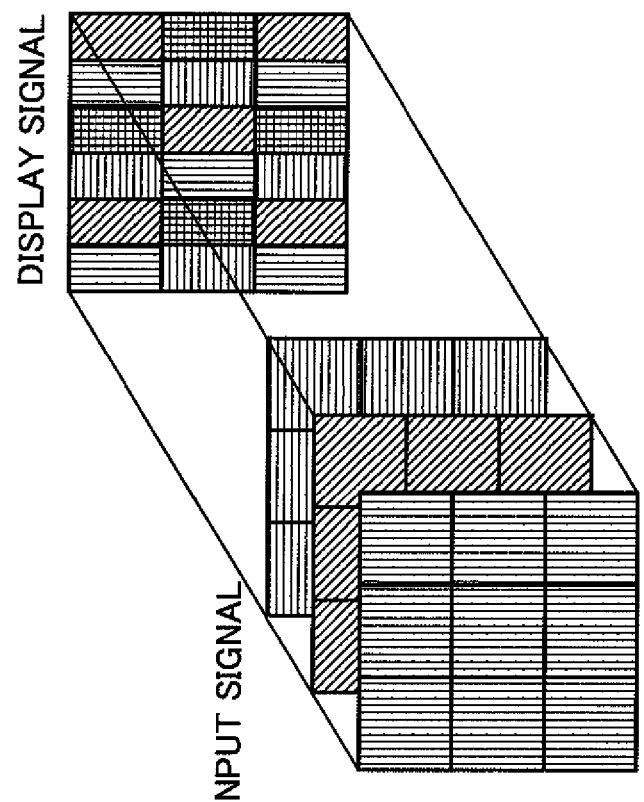
FIGS. 13A and 13B are diagrams illustrating a sub pixel arrangement of the display panel.
Figure 13A:
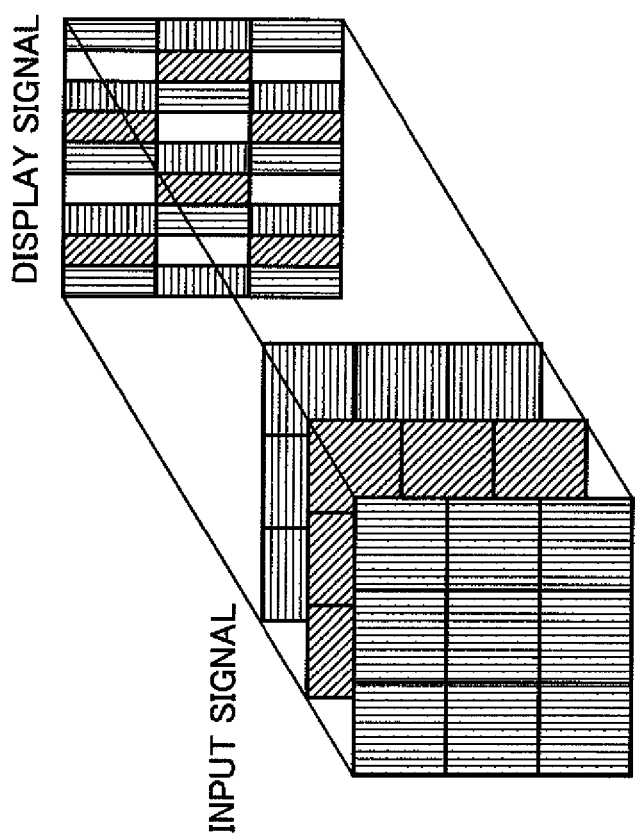

FIG. 13A illustrates a display panel in which RGBW color filters are arranged regularly as color types with the same existing RGB sub pixel arrangement of the display panel. In this RGBW display panel, color type combinations of the sub pixels corresponding to the pixel positions of the input RGB signal are four types of RGB, GBW, BWR, and WRG.

Then, combinations of four type sub pixels are repeated at a period of the four pixels. In the horizontal direction, the same color appears every four sub pixels. In the vertical direction, the same color appears every other line in this example, and periods of individual colors in the two-dimensional position are uniform. However, the color type and the color arrangement of the sub pixels are not limited to this structure.

In this example, because each of RGBW colors is included three times in the period of four pixels as RGB transmittance is 1 and W transmittance is 3, the total is (1(R)+1 (G)+1 (B)+3 (W))×3=18.

On the other hand, in the RGB display panel, because each of the RGB colors is included four times in the period of four pixels, the total is (1(R)+1(G)+1(B))×4=12. Comparing the RGBW display panel and the RGB display panel, it is understood that transmittance may be improved by 1.5 times.

The W signal may use MIN (R, G, B), MAX (R, G, B), or a value obtained by multiplying a coefficient K to one of them, or the like, as described above. The coefficient K may be set in a variable manner based on the chroma saturation of the signal, the environmental brightness of the signal, or the like.

The input RGB signal and the RGBW signal for displaying have different pixel arrangements. Therefore, the signal conversion unit of this embodiment is used for generating the sub pixel signal for displaying.

First, using the pixel arrangement determination unit 151, the type of the four types of the sub pixel structure is determined. It is assumed that the synchronizing signal 140 includes the vertical synchronizing signal Vsync, the horizontal synchronizing signal Hsync, and the pixel clock Pclk.

The line number counter Vcount counts up the horizontal synchronizing signal Hsync, and the pixel number counter Hcount counts up the pixel clock Pclk. Each of them has a value 0 at the uppermost and leftmost position.

In this case, the positional relationship between the counter value and the sub pixel of the display panel is expressed as follows, where the least significant bit of the line number counter Vcount is denoted by V0, and the two lower bits of the pixel number counter Hcount are denoted by H1 and H0.

IF (V0=0) {
  IF (H1=0)& (H0=0)) THEN RGB SUB PIXEL
  IF (H1=0)& (H0=1)) THEN WRG SUB PIXEL
  IF (H1=1)& (H0=0)) THEN BWR SUB PIXEL
  IF (H1=1)& (H0=1)) THEN GBW SUB PIXEL}ELSE IF (V0=1) {
  IF (H1=0)& (H0=0)) THEN BWR SUB PIXEL
  IF (H1=0)& (H0=1)) THEN GBW SUB PIXEL
  IF (H1=1)& (H0=0)) THEN RGB SUB PIXEL
  IF (H1=1)& (H0=1)) THEN WRG SUB PIXEL}

Then, the RGBW signals of the target pixel and the adjacent pixels stored in the line memory 152 temporarily is read out, whether the RGBW signals are matched with the judgment pattern that is prepared in advance by using the signal pattern determination unit 153 is detected, and based on a result of the judgment pattern and the sub pixel structure, the signal distribution unit 154 may generate the sub pixel signal. Here, the generating method of the sub pixel signal in the signal distribution unit 154 is determined in advance so as to prevent the image quality deterioration.

A merit of this sub pixel arrangement is in that the existing technology of a display panel of RGB sub pixels arrangement may be utilized.

By only changing the color type of the color filter of the display panel, and adding the display signal conversion apparatus of this embodiment, the signal conversion for generating the sub pixel signal of this embodiment is performed. In this embodiment, electric and physical characteristics of the input signal 110 and the display signal 130 are maintained. Therefore, the existing RGB display panel and the illustrated RGBW display panel may be connected to each other in a compatible manner.

The signal conversion of this embodiment based on the color type and the color arrangement of the sub pixel of the display panel is provided. Therefore, the same display screen may be obtained by both panels. It is possible to provide a unit for negotiating the color type and the color arrangement of the sub pixel of the display panel when the display panel is connected. Thus, the RGBW panel that is easily manufactured and the display signal conversion apparatus of this embodiment having the simple circuit structure are combined, so as to improve the transmittance. In addition, by combining with the luminance modulation unit of the backlight, reduction of power consumption and improvement of contrast may be realized.

FIG. 13B illustrates an example where a yellow color filter is disposed instead of the W (white color) filter. With an apparatus structure similar to that described above, the signal conversion for generating the sub pixel signal may be performed. This display panel may be combined with a multicolor backlight with modulatable luminance so as to perform display.

Figure 14A:
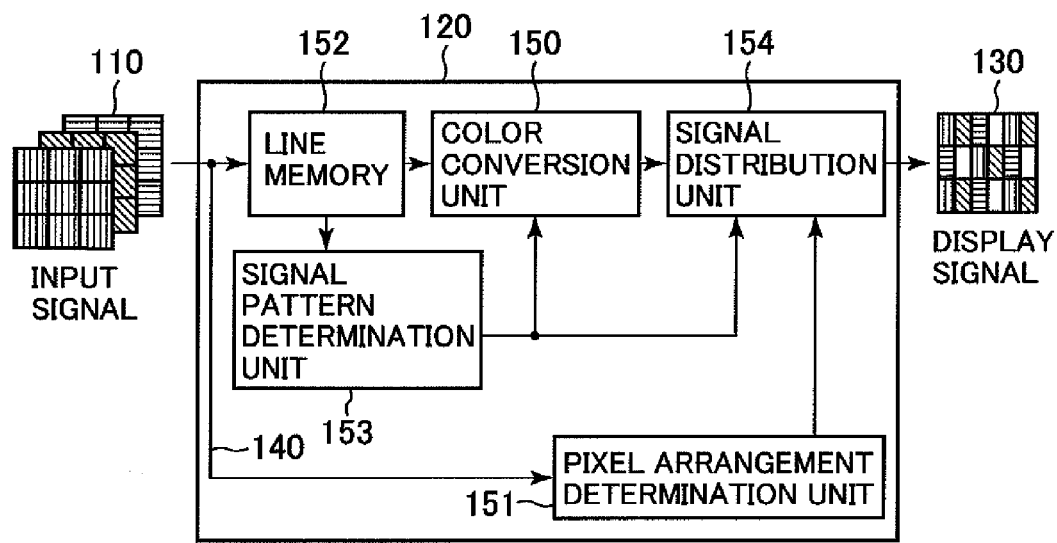
FIGS. 14A and 14B are diagrams illustrating a variation example of the fundamental structure of the display signal conversion apparatus according to the embodiment of the present invention.
Figure 14B:
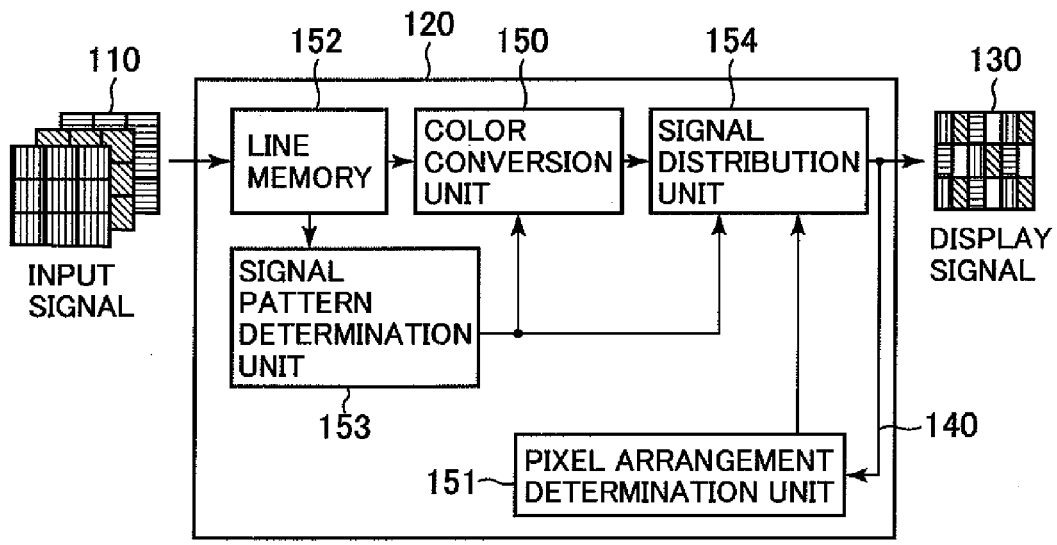

As illustrated in FIGS. 14A and 14B, the order of the color conversion may be changed. A result of the signal pattern determination unit 153 may be input to the color conversion unit 150 and may be used for adjusting or switching a method of processing the color conversion. Thus, the method for the color conversion may be switched between a region having a small signal change like a photograph and a region having a large signal change like a letter or a figure, for example. For instance, as the generating method of the W signal, the coefficient setting method in the conversion based on amplitude of the signal, as described above may be used.

$$W = MAX(R, G, B) \times K$$

$$W = MIN(R, G, B) \times K$$

Here, the coefficient K is set based on a result of the signal pattern determination unit 153. As to the coefficient K, a two-dimensional signal change is considered so that roughness due to turning on of the W sub pixel does not appear in the photograph region, and a signal change of the sub pixel unit is stored in the letter or figure region. The signal pattern determination unit 153 utilizes the difference between the photograph region and the letter or figure region for detecting a fine line or an edge, and hence the two-dimensional signal change in the image region may be detected.

As described above, the present invention made by the inventors of the present invention is specifically explained based on the embodiments, but the present invention is not limited to the embodiments. The present invention may be modified variously within the scope of the present invention without deviating from the spirit thereof.

What is claimed is:

1. A display signal conversion apparatus for converting a first signal having a first color format and color arrangement into a second signal having a second color format and color arrangement, the display signal conversion apparatus comprising:
   a color conversion unit configured to convert the first color format into the second color format;
   a pattern determination unit configured to determine a signal pattern of the first signal;
   a unit configured to determine a color arrangement of a pixel position of the second signal corresponding to a pixel position of the first signal; and
   a sub pixel signal generation unit configured to generate a sub pixel signal having the second color format and color arrangement based on a result of the signal pattern determination and a result of the color arrangement determination.

2. The display signal conversion apparatus according to claim 1, wherein the first signal comprises a signal of disposing RGB sub pixels at individual pixels, and
   wherein the second signal comprises a signal of disposing one of RG sub pixels and BW sub pixels at individual pixels.

3. The display signal conversion apparatus according to claim 2, wherein the color conversion unit converts RGB of the first signal into RGBW of the second signal, and
   wherein the color conversion unit controls amplitude of a W signal based on a result of the pattern determination unit.

4. The display signal conversion apparatus according to claim 2, wherein the color conversion unit converts RGB of the first signal into RGBW of the second signal, and
   wherein the color conversion unit controls amplitude of a W signal based on chroma saturation of a screen.

5. The display signal conversion apparatus according to claim 2, wherein the color conversion unit converts RGB of the first signal into RGBW of the second signal, and
   wherein the color conversion unit controls amplitude of a W signal based on environmental brightness.

6. The display signal conversion apparatus according to claim 2, wherein the color conversion unit converts RGB of the first signal into RGBW of the second signal, and
   wherein the color conversion unit controls amplitude of a W signal based on a time interval of operation by a user.

7. The display signal conversion apparatus according to claim 1, wherein the color format of the second signal comprises RGBW, and
   wherein the pixel of the second signal that is associated with the pixel position of the first signal has two colors selected from the groups consisting of R, G, B and W.

8. The display signal conversion apparatus according to claim 1, wherein the pattern determination unit sets a background color and a foreground color in an arbitrary region in color space having a coordinate axis of one of a first color and a second color,
   wherein the pattern determination unit generates binary signals indicating whether a target pixel and adjacent pixels belong to the arbitrary region, and
   wherein the pattern determination unit sets a combination of the binary signals of the target pixel and the adjacent pixels as a determination target.

9. The display signal conversion apparatus according to claim 8, wherein the pattern determination unit generates binary signal patterns of at least yellow color, blue color, white color, and black color, and
   wherein the binary signal patterns indicate a pixel arrangement as one of the background color and the foreground color.

10. The display signal conversion apparatus according to claim 1, wherein the first signal comprises:
    an RGB signal supplied externally and an RGB signal generated internally; and
    wherein the second signal comprises:
    R, G, B and W formats of sub pixels on a line width of a pixel.

11. The display signal conversion apparatus according to claim 1, wherein:
    the color format of the first signal comprises RGB;
    the color formats of the second signal corresponding to the pixel position of the first signal are four formats of RGB, GBW, BWR, and WRG; and
    the color arrangement of the second signal comprises a cyclic arrangement of RGB, GBW, BWR, and WRG in a horizontal direction.

12. The display signal conversion apparatus according to claim 1, wherein the sub pixel signal generation unit generates the sub pixel signal having a period shorter than a pixel period of an input signal.

13. A display signal conversion apparatus comprising:
- a unit configured to perform color conversion of an input RGB signal into an RGBW signal;
- a unit configured to determine a signal pattern of a two-dimensional position of one of the input RGB signal and the RGBW signal after the color conversion;
- a pattern determination unit configured to determine a sub pixel arrangement corresponding to a pixel position of an input signal; and
- a sub pixel signal generation unit configured to generate a sub pixel signal using a predetermined arrangement conversion based on a result of the signal pattern determination and the sub pixel arrangement determination.

14. The display signal conversion apparatus according to claim 13, wherein the sub pixel signal generation unit generates the sub pixel signal by converting the RGBW signal of a target pixel into one of a different pixel and a different color based on a signal pattern determination signal of the target pixel and a sub pixel arrangement signal.

15. The display signal conversion apparatus according to claim 14, wherein the sub pixel signal generation unit comprises a logic circuit configured to generate the sub pixel signal that meets conditions of the signal pattern determination signal of the target pixel and the sub pixel arrangement signal.

* * * * *